United States Patent
Lewandowski et al.

(10) Patent No.: US 9,334,428 B2
(45) Date of Patent: May 10, 2016

(54) PRESSURE-SENSITIVE ADHESIVES PREPARED FROM DEGRADABLE MONOMERS AND POLYMERS

(71) Applicant: 3M INNOVATIVE PROPERTIES COMPANY, St. Paul, MN (US)

(72) Inventors: Kevin M. Lewandowski, Inver Grove Heights, MN (US); Corinne E. Lipscomb, St. Paul, MN (US); Jonathan E. Janoski, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/648,847

(22) PCT Filed: Nov. 26, 2013

(86) PCT No.: PCT/US2013/071854
§ 371 (c)(1),
(2) Date: Jun. 1, 2015

(87) PCT Pub. No.: WO2014/099300
PCT Pub. Date: Jun. 26, 2014

(65) Prior Publication Data
US 2015/0337179 A1    Nov. 26, 2015

Related U.S. Application Data

(60) Provisional application No. 61/739,136, filed on Dec. 19, 2012.

(51) Int. Cl.
| | | |
|---|---|---|
| *C09J 133/10* | (2006.01) | |
| *C09J 133/02* | (2006.01) | |
| *C08F 220/26* | (2006.01) | |
| *C09J 4/00* | (2006.01) | |
| *C08F 220/10* | (2006.01) | |
| *C09J 133/06* | (2006.01) | |

(52) U.S. Cl.
CPC .............. *C09J 133/10* (2013.01); *C08F 220/10* (2013.01); *C08F 220/26* (2013.01); *C09J 4/00* (2013.01); *C09J 133/02* (2013.01); *C09J 133/06* (2013.01)

(58) Field of Classification Search
CPC ....................................................... C09J 133/10
USPC .......................................... 526/321; 524/559
See application file for complete search history.

(56) References Cited

U.S. PATENT DOCUMENTS

| | | | |
|---|---|---|---|
| 4,180,673 A | 12/1979 | Burguette | |
| 4,547,451 A | 10/1985 | Jasne | |
| 5,648,425 A | 7/1997 | Everaerts | |
| 6,521,431 B1 | 2/2003 | Kiser | |
| 6,777,079 B2 | 8/2004 | Zhou | |
| 7,385,020 B2 | 6/2008 | Anderson | |
| 7,754,241 B1 | 7/2010 | Webb | |
| 7,932,305 B2 * | 4/2011 | Badejo ................... A61L 15/58 523/118 |
| 8,148,457 B2 * | 4/2012 | Asai ................... C08F 290/046 428/355 AC |
| 2003/0078354 A1 | 4/2003 | Medina | |
| 2007/0208098 A1 | 9/2007 | Okada | |
| 2009/0270003 A1 | 10/2009 | Anderson | |
| 2011/0104486 A1 | 5/2011 | Ma | |
| 2012/0172563 A1 | 7/2012 | Carloff | |
| 2014/0370281 A1 | 12/2014 | Lewandowski | |
| 2014/0377553 A1 | 12/2014 | Clapper | |

FOREIGN PATENT DOCUMENTS

| | | |
|---|---|---|
| EP | 0576128 | 12/1993 |
| EP | 0637618 | 2/1995 |
| EP | 2072594 | 6/2009 |
| GB | 1242980 | 8/1971 |
| JP | 58-47066 | 3/1983 |
| JP | 07-330835 | 12/1995 |
| WO | WO 2011/051032 | 5/2011 |
| WO | WO 2011/119363 | 9/2011 |

OTHER PUBLICATIONS

Ivanchev, "Synthesis and Some Properties of Acrylate Copolymers With Controlled Hydrolytic Properties", Vysokomolekularnye soedinenia. Seria A, 1996, vol. 38, No. 9, pp. 1498-1502.
Rehberg, "Polymerizable Esters of Lactic Acid. α-Carbalkoxyethyl Acrylates and Methacrylates", Journal of the American Chemical Society, Feb. 1, 1945, vol. 67, No. 2, pp. 208-210.
Yonezawa, "Studies on the Syntheses and Polymerization of Alkoxycarbonylmethylacrylate", Journal of Synthetic Organic Chemistry Japan, 1969, vol. 27, No. 12, pp. 1218-1223.
International Search Report for PCT International Application No. PCT/US2013/071854 mailed on Mar. 4, 2014, 3 pages.

* cited by examiner

*Primary Examiner* — Vu A Nguyen
(74) *Attorney, Agent, or Firm* — Jean A. Lown

(57) ABSTRACT

Pressure-sensitive adhesives that have good performance characteristics under typical use conditions and that later can be degraded and/or removed readily under basic conditions are provided. More specifically, the pressure-sensitive adhesives contain a copolymeric (meth)acrylic-based elastomeric material prepared from a polymerizable material that contains a (meth)acrylate monomer having both a (meth)acryloyl group plus an ester linkage that is not part of a (meth)acryloyl group.

15 Claims, No Drawings

PRESSURE-SENSITIVE ADHESIVES PREPARED FROM DEGRADABLE MONOMERS AND POLYMERS

CROSS REFERENCE TO RELATED APPLICATIONS

This application is a national stage filing under 35 U.S.C. 371 of PCT/US2013/071854, filed Nov. 26, 2013, which claims priority to U.S. Provisional Application No. 61/739,136, filed Dec. 19, 2012, the disclosure of which is incorporated by reference in its/their entirety herein.

TECHNICAL FIELD

Pressure-sensitive adhesives and articles containing the pressure-sensitive adhesives are described.

BACKGROUND

Pressure-sensitive adhesive (PSA) tapes are virtually ubiquitous in the home and workplace. In one of its simplest configurations, a pressure-sensitive tape includes a backing layer and an adhesive layer attached to the backing layer. According to the Pressure-Sensitive Tape Council, pressure-sensitive adhesives are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C. to 25° C.). Materials that are merely sticky or adhere to a surface do not constitute a pressure-sensitive adhesive; the term pressure-sensitive adhesive encompasses materials with additional viscoelastic properties.

One important class of pressure-sensitive adhesives are those with a methacrylic-based elastomeric material. (Meth)acrylic-based elastomeric materials have been described, for example, in the following patent references: EP Patent Application 2072594 A1 (Kondou et al.), U.S. Pat. No. 5,648,425 (Everaerts et al.), U.S. Pat. No. 6,777,079 B2 (Zhou et al.), and U.S. Patent Application Publication 2011/04486 A1 (Ma et al.).

The (meth)acrylic-based elastomeric material typically is selected to provide a pressure-sensitive adhesive that is stable under normal use conditions. In some applications, for example, it is desirable that the pressure-sensitive adhesive remains stable under conditions such as relatively high temperatures and/or relatively high humidity. In other applications, however, it is desirable that the pressure-sensitive adhesive can be easily removed at the end of its useful life. For example, it can be desirable to remove adhesive labels after use or to separate adhered parts and assemblies for recycling purposes.

SUMMARY

Pressure-sensitive adhesives that have good performance characteristics under typical use conditions and that later can be degraded and/or removed readily under basic conditions are described. More specifically, the pressure-sensitive adhesives contain a copolymeric (meth)acrylic-based elastomeric material prepared from a polymerizable material that contains a (meth)acrylate monomer having both a (meth)acryloyloxy group ($CH_2$=$CHR^3$—(CO)—O—) plus an ester linkage (—O—(CO)—) that is not part of a (meth)acryloyloxy group.

In a first aspect, a pressure-sensitive adhesive is provided that contains a copolymeric (meth)acrylic-based elastomeric material. The (meth)acrylic-based elastomeric material comprises a reaction product of a polymerizable material that contains (a) a first monomer of Formula (I)

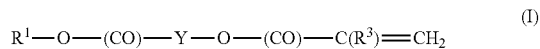

and (b) a second monomer having an ethylenically unsaturated group. In Formula (I), group $R^1$ is an alkyl, aryl, or combination thereof. Group Y is a branched or linear alkylene of formula —$C_n(R^2)_{2n}$— wherein the group $R^2$ is hydrogen or alkyl and wherein the variable n is an integer in a range of 1 to 12. Group $R^3$ is hydrogen or methyl.

In a second aspect, a pressure-sensitive adhesive is provided that contains a copolymeric (meth)acrylic-based elastomeric material. The (meth)acrylic-based elastomeric material comprises multiple first units of Formula (XX)

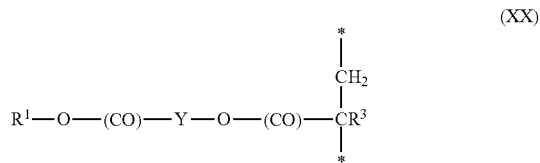

and multiple second units of Formula (XXI).

In Formula (XX), group $R^1$ is an alkyl, aryl, or combination thereof. Group Y is a branched or linear alkylene of formula —$C_n(R^2)_{2n}$— wherein the group $R^2$ is hydrogen or alkyl and wherein the variable n is an integer in a range of 1 to 12. The second units of Formula (XXI) are derived from a second monomer that is a crosslinker monomer having at least two ethylenically unsaturated groups, a non-polar monomer with a single ethylenically unsaturated group, or a polar monomer with a single ethylenically unsaturated group. Group Q is equal to the second monomer minus a vinyl group ($CH_2$=$CHR^3$—). In Formulas (XX) and (XXI), group $R^3$ is hydrogen or methyl and the asterisk (*) indicates where each unit is connected to another unit in the copolymeric (meth)acrylic-based elastomeric material.

In a third, an article is provided that includes a pressure-sensitive adhesive layer and a substrate positioned adjacent to the pressure-sensitive adhesive layer. The pressure-sensitive adhesive layer contains the (meth)acrylic-based elastomeric material defined above in the first aspect or in the second aspect.

DETAILED DESCRIPTION

Pressure-sensitive adhesives that have good performance characteristics under typical use conditions and that later can be degraded and/or removed readily under basic conditions are described. These pressure-sensitive adhesives are particularly useful for applications where the substrate to which the adhesive is adhered is subsequently recycled or de-bonded for use in another article. That is, the sticky pressure-sensitive adhesive can be conveniently removed from the substrate.

More particularly, the pressure-sensitive adhesive contains a copolymeric (meth)acrylic-based elastomeric material. As used herein, the term "(meth)acrylic" refers to a material that is prepared using at least one monomer having a (meth)acryloyl group, which is a group of formula $CH_2=CHR^3-(CO)-$ where $R^3$ is hydrogen or methyl and the group $-(CO)-$ refers to a carbonyl group. The term (meth)acryloyl refers to a methacryloyl group, an acryloyl group, or both. Typically, at least 50 mole percent of the monomers used to form the (meth)acrylic-based elastomeric material have (meth)acryloyl groups.

The (meth)acrylic-based elastomeric material is a copolymer comprising a reaction product of polymerizable material that contains (a) a first monomer of Formula (I)

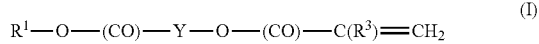

and (b) a second monomer having an ethylenically unsaturated group. As used herein, the term "polymerizable material" refers to compounds having a polymerizable group such as an ethylenically unsaturated group that can undergo a free radical polymerization reaction. The (meth)acrylic-based elastomeric material included in the pressure-sensitive adhesive is a (meth)acrylic copolymer prepared from at least two different monomers (i.e., a compound with a polymerizable group).

Group $R^1$ in Formula (I) for the first monomer is an alkyl, aryl, or combination thereof. Suitable alkyl groups can be linear, branched, cyclic, or a combination thereof. The alkyl group often has up to 20 carbon atoms, up to 18 carbon atoms, up to 16 carbon atoms, up to 12 carbon atoms, up to 10 carbon atoms, up to 6 carbon atoms, or up to 4 carbon atoms. For example, linear alkyl groups can have 1 to 20 carbon atoms, branched alkyl groups can have 3 to 20 carbon atoms, and cyclic alkyl groups can have 3 to 20 carbon atoms or 6 to 20 carbon atoms. Suitable aryl groups often have 6 to 20 carbon atoms, 6 to 12 carbon atoms, or 6 to 10 carbon atoms. The aryl group is often phenyl.

As used herein in reference to a combination of aryl and alkyl, group $R^1$ can be an aralkyl group or alkaryl group. The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms and an aryl portion often has 6 to 20 carbon atoms, 6 to 18 carbon atoms, 6 to 16 carbon atoms, 6 to 12 carbon atoms, or 6 to 10 carbon atoms. In some groups, the aryl portion is phenyl and the alkyl portion has 1 to 10 carbon atoms, 1 to 6 carbon atoms, or 1 to 4 carbon atoms.

Group $R^3$ in Formula (I) is hydrogen or methyl. That is, the first monomer is an acrylate when $R^3$ is hydrogen or a methacrylate when $R^3$ is methyl. In many embodiments, $R^3$ is hydrogen.

Group Y in Formula (I) is a branched or linear alkylene of formula $-C_n(R^2)_{2n}-$ wherein the group $R^2$ is hydrogen or alkyl and wherein the variable n is an integer in a range of 1 to 12. Stated differently, Y can be an alkylene having 1 to 12 carbon atoms. As used herein, the term "alkylene" refers to a divalent radical of an alkane. Group Y can be an alkylene having up to 10 carbon atoms, up to 8 carbon atoms, up to 6 carbon atoms, or up to 4 carbon atoms. In some embodiments, Y has 1 to 10 carbon atoms, 2 to 10 carbon atoms, 3 to 10 carbon atoms, 1 to 8 carbon atoms, 1 to 6 carbon atoms, or 1 to 4 carbon atoms. When $R^2$ is an alkyl, this group can be linear or branched and can have up to 11 carbon atoms, up to 10 carbon atoms, up to 6 carbon atoms, or up to 4 carbon atoms. For example, $R^2$ can be an alkyl with 1 to 10 carbon atoms, 2 to 10 carbon atoms, 3 to 10 carbon atoms, 1 to 6 carbon atoms, or 1 to 4 carbon atoms.

In some embodiments, the group Y is of formula $-C_nH_{2n}-$ where n is a variable that is an integer in a range of 1 to 12 as described above. Such a monomer is of Formula (Ia), which is a subset of Formula (I).

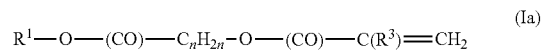

In Formula (Ia), n can be an integer in a range 1 to 10, in a range of 1 to 8, in a range of 1 to 6, or in a range of 1 to 4. Some specific examples of Y include $-CH_2-$ where n is equal to 1 as in the monomer of Formula (Ib), which is a subset of both Formula (I) and (Ia).

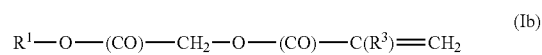

Some more specific examples of Formula (Ib) are alkyl acryloxy glycolates such as butyl acryloxy glycolate ($R^1$ is butyl), n-octyl acryloxy glycolate ($R^1$ is n-octyl), and 2-ethylhexyl acryloxy glycolate ($R^1$ is 2-ethylhexyl). $R^3$ is hydrogen in these alkyl acryloxy glycolates. Other example monomers of Formula (Ia) include ethyl-6-acryloxy-hexanoate where $R^1$ is ethyl and Y is pentylene ($-C_5H_{10}-$).

In other embodiments, the group Y in Formula (I) is of formula $-C_nH_p(R^{2a})_q-$ where p is an integer equal to at least zero, q is an integer equal to at least 1, and the sum (p+q) is equal to 2n. The monomer is of Formula (Ic), which is a subset of Formula (I).

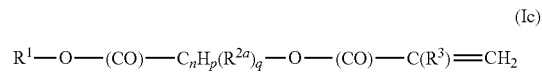

The variable n is the same as defined above for Formula (Ia). In Formula (Ic), group $R^{2a}$ is a linear or branched alkyl having up to up to 11 carbon atoms, up to 10 carbon atoms, up to 6 carbon atoms, or up to 4 carbon atoms. For example, $R^{2a}$ can be an alkyl with 1 to 10 carbon atoms, 2 to 10 carbon atoms, 3 to 10 carbon atoms, 1 to 6 carbon atoms, or 1 to 4 carbon atoms. Some specific examples of Y include $-CHR^{2a}-$ (p is equal to 1, q is equal to 1, and n is equal to 1) as in the monomer of Formula (Id) and $-C(R^{2a})_2-$ (where p is equal to zero, q is equal to 2, and n is equal to 1) as in the monomer of Formula (Ie).

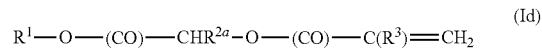
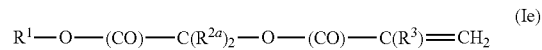

Formulas (1d) and (Ie) are both subsets of Formula (Ic). Some specific examples of Formula (Id) include alkyl acryloxy lactates such as ethyl acryloxy lactate ($R^1$ is ethyl), n-octyl acryloxy lactate ($R^1$ is n-octyl), 2-octyl acryloxy lactate ($R^1$ is 2-octyl), 2-ethylhexyl acryloxy lactate ($R^1$ is 2-ethylhexyl), and 1-hexyl acryloxy lactate ($R^1$ is 1-hexyl). $R^3$ is hydrogen and $R^{2a}$ is methyl in these alkyl acryloxy lactates. Other specific examples of Formula (Id) include 1-butyl-2-acryloxy hexanoate ($R^1$ is 1-butyl, $R^{2a}$ is butyl, and $R^3$ is hydrogen). Some specific examples of monomers of Formula (Ie) include ethyl-2-acryloxy-2-methyl propionate ($R^1$ is ethyl, each $R^{2a}$ is methyl, and $R^3$ is hydrogen). Some specific examples of monomers of Formula (Ic) include 1-butyl-3-acryloxy-butyrate wherein $R^1$ is 1-butyl, and $-C_nH_p(R^{2a})_q-$ is $-CH_2CH(CH_3)-$. That is, n is equal to 2, p is equal to 3, q is equal to 1, and $R^ea$ is methyl.

Some specific first monomers of Formula (I) include the following compounds:
$CH_3CH_2CH_2CH_2-O-(CO)-CH_2-O-(CO)-CH_2-CH_2$, $CH_3CH_2CH_2CH_2CH_2CH_2CH_2CH_2-O-(CO)-CH_2-O-(CO)-CH_2-CH_2$, $CH_3CH_2CH_2CH_2CH(CH_2CH_3)CH_2-O-(CO)-CH_2-O-(CO)-CH_2=CH_2$, $CH_3CH_2-O-(CO)-CH(CH_3)-O-(CO)-CH_2=CH_2$, $CH_3CH_2-O-(CO)-C(CH_3)_2-O-(CO)-CH_2$ $CH_2$, $CH_3CH_2CH_2CH_2-O-(CO)-CH(CH_3)-O-(CO)-CH_2=CH_2$, $CH_3CH_2CH_2CH_2CH_2CH_2-O-(CO)-CH(CH_3)-O-(CO)-CH_2=CH_2$, $CH_3CH_2CH_2CH_2CH_2CH_2CH_2CH_2-O-(CO)-CH(CH_3)-O-(CO)-CH_2=CH_2$, $CH_3CH_2CH_2CH_2CH(CH_2CH_3)CH_2-O-(CO)-CH(CH_3)-O-(CO)-CH_2=CH_2$, $CH_3CH_2CH_2CH_2CH_2CH_2CH(CH_3)-O-(CO)-CH(CH_3)-O-(CO)-CH_2=CH_2$, $CH_3CH_2-O-(CO)-CH_2CH_2CH_2CH_2-O-(CO)-CH_2$ $CH_2$, $CH_3CH_2CH_2CH_2-O-(CO)-CH_2CH(CH_3)-O-(CO)-CH_2=CH_2$, and $CH_3CH_2CH_2CH_2-O-(CO)-CH(CH_2CH_2CH_2CH_3)-O-(CO)-CH_2=CH_2$.

In some embodiments, the first monomer of Formula (I) includes $CH_3CH_2CH_2CH_2-O-(CO)-CH_2-O-(CO)-CH_2=CH_2$ or $CH_3CH_2CH_2CH_2-O-(CO)-CH(CH_3)-O-(CO)-CH_2=CH_2$.

The monomers of Formula (I) can be prepared using any suitable process. One method of preparing the monomers is shown in Reaction Scheme A.

Reaction Scheme A

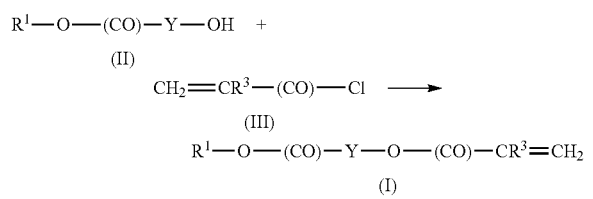

A hydroxy ester of Formula (II) can be reacted with a (meth) acryloyl chloride in the presence of a base such as triethylamine to form the monomer of Formula (I). Some hydroxy esters of Formula (II) are commercially available such as, for example, various alkyl glycolates, various alkyl lactates, ethyl-2-hydroxy-isobutyrate, ethyl-6-hydroxyhexanoate, ethyl-3-hydroxy butyrate, and methyl-2,2-dimethyl-3-hydroxy propionate.

Other hydroxyl esters of Formula (II) can be prepared as shown in Reaction Scheme B where an alcohol of Formula (IV) is reacted with a hydroxy acid of Formula (V). Example hydroxy acids of Formula (V) include L-lactic acid, D-lactic acid, glycolic acid, 3-hydroxypropanic acid, 3-hydroxybutyric acid, 4-hydroxybutyric acid, 4-hydroxypentanoic acid, 3-hydroxypentanoic acid, 5-hydroxypentanoic acid, 3-hydroxyhexanoic acid, 6-hydroxyhexanoic acid, 3-hydroxyheptanoic acid, 3-hydroxyoctanoic acid, 2-hydroxyisobutyric acid, and 10-hydroxydecanoic acid.

Reaction Scheme B

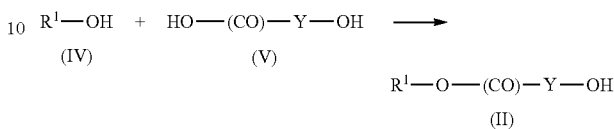

Alternatively, Reaction Scheme C can be used to form the monomers of Formula (I). In this method, an alcohol of Formula (IV) is reacted with a halogenated acid of Formula (VI) to form a halogenated intermediate of Formula (VII). The halogenated intermediate is then reacted with (meth)acrylic acid of Formula (VIII) to form the monomer of Formula (I). Example halogenated acids are usually chlorinated acids or brominated acids such as chloroacetic acid, bromacetic acid, 2-chloropropionic acid, 2-bromopropionic acid, 3-chloropropionic acid, 4-chlorobutyric acid, 2-bromobutyric acid, 2-bromohexanoic acid, and 2-bromovaleric acid.

Reaction Scheme C

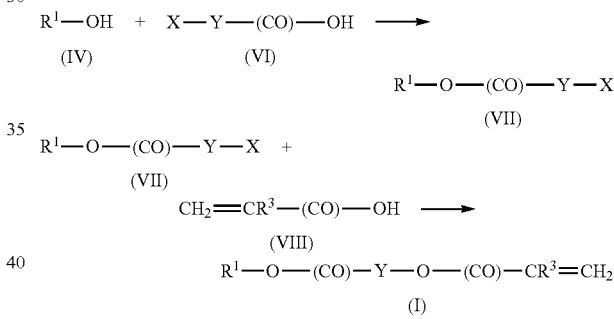

Yet another alternative, Reaction Scheme D can be used to form monomers of Formula (I). In this method, an alcohol of formula (IV) is reacted with a lactone of Formula (IX) to form a hydroxy ester of Formula (II). The hydroxy ester of Formula (II) can then be reacted as in Reaction Scheme A to form the monomer of Formula (I). Example lactones of Formula (IX) include β-propiolactone, β-butyrolactone, γ-butyrolactone, α-methyl-v-butyrolactone, v-valerolactone, v-caprolactone, v-octanoic lactone, v-decanolactone, v-undecanoic lactone, ε-caprolactone, and oxacyclododecan-2-one.

Reaction Scheme D

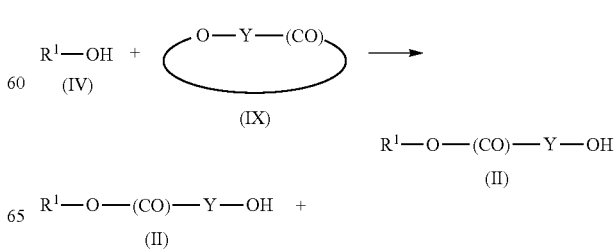

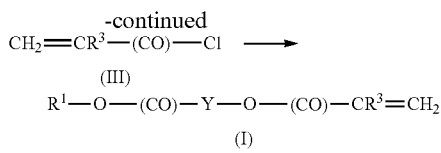

Any suitable amount of the first monomer of Formula (I) can be used to prepare the copolymeric (meth)acrylic-based elastomeric material. In some embodiments, at least 10 weight percent of the polymerizable material used to form the elastomeric material is the first monomer of Formula (I). The polymerizable material can include at least 20 weight percent, at least 30 weight percent, at least 40 weight percent, or at least 50 weight percent of the first monomer of Formula (I). The polymerizable material can include up to 99 weight percent or even higher (e.g., up to 99.5 weight percent), up to 98 weight percent, up to 95 weight percent, up to 90 weight percent, up to 80 weight percent, up to 70 weight percent, or up to 60 weight percent of the first monomer. In some embodiments, the polymerizable material includes 10 to 99.5 weight percent, 20 to 99 weight percent, 20 to 95 weight percent, 20 to 90 weight percent, 20 to 80 weight percent, 20 to 70 weight percent, 30 to 90 weight percent, 40 to 90 weight percent, or 50 to 90 weight percent of the first monomer. The amounts are based on a total weight of polymerizable material.

(Meth)acrylic-based elastomeric materials prepared using the monomers of Formula (I) in the polymerizable material tend to undergo degradation when exposed to basic conditions that are typically encountered for recycling polyester materials. That is, the ester linkages from the monomers of Formula (I) that are in the polymeric material tend to undergo ester hydrolysis reactions when exposed to an aqueous solution having a pH greater than 7 at 80° C. within 24 hours. Example basic aqueous solutions include 2 weight percent base (e.g., sodium hydroxide, potassium hydroxide, or tetraalkylammonium hydroxide) dissolved in water. Higher amounts of the monomer of Formula (I) will lead to more degradation of the (meth)acrylic-based elastomeric material under basic conditions.

The polymerizable material used to form the (meth) acrylic-based elastomeric material includes a second monomer having an ethylenically unsaturated group. The ethylenically unsaturated group can be a vinyl (i.e., $CH_2=CHR^3—$ group) or (meth)acryloyl group (i.e., $CH_2=CHR^3—(CO)—$) but is often a (meth)acryloyl group. The second monomer can be a non-polar monomer with a single ethylenically unsaturated group, a polar monomer with a single ethylenically unsaturated group, a crosslinker monomer having at least two ethylenically unsaturated groups, or a mixture thereof. The second monomer and the amount of the second monomer are typically selected to provide a (meth)acrylic-based elastomeric material having a glass transition temperature ($T_g$) no greater than 10° C. For example, the $T_g$ is often no greater than 0° C., no greater than −10° C., no greater than −20° C., or no greater than −30° C. The glass transition temperature can be measured using a Differential Scanning calorimeter as described in the Example section.

Some commonly used non-polar monomers with a single ethylenically unsaturated group are (meth)acrylate esters such as alkyl (meth)acrylates, aryl (meth)acrylates, aryl substituted alkyl (meth)acrylates, aryloxy substituted alkyl (meth)acrylates, alkenyl (meth)acrylates, and the like. These monomers do not have an additional ester linkage in addition to that present in the (meth)acryloyloxy group. Unlike the monomers of Formula (I), these monomers typically do not undergo ester hydrolysis reactions within 24 hours at a temperature of 80° C. when exposed to basic conditions such as 2 weight percent base dissolved in water. The combination of the first monomer of Formula (I) with any of these non-polar second monomers can be used to prepare copolymers with varying tendency towards ester hydrolysis and with varying tendency towards degradation and/or removal from a substrate. That is, the rate of ester hydrolysis of a (meth)acrylic-based elastomeric material tends to decrease with an increase in the amount of non-polar (meth)acrylate esters used as the second monomer.

Suitable alkyl (meth)acrylates often have an alkyl group with 1 to 32 carbon atoms, 1 to 20 carbon atoms, 1 to 18 carbon atoms, 1 to 12 carbon atoms, 1 to 10 carbon atoms, 1 to 6 carbon atoms, or 1 to 4 carbon atoms. Example alkyl (meth)acrylates include, but are not limited to, methyl (meth) acrylate, ethyl (meth)acrylate, n-propyl (meth)acrylate, isopropyl (meth)acrylate, n-butyl (meth)acrylate, isobutyl (meth)acrylate, tert-butyl methacrylate, n-pentyl (meth)acrylate, isopentyl (meth)acrylate (i.e., isoamyl (meth)acrylate), 3-pentyl (meth)acrylate, 2-methyl-1-butyl (meth)acrylate, 3-methyl-1-butyl (meth)acrylate, n-hexyl (meth)acrylate, isohexyl (meth)acrylate, 2-methyl-1-pentyl (meth)acrylate, 3-methyl-1-pentyl (meth)acrylate, 4-methyl-2-pentyl (meth) acrylate, 2-ethyl-1-butyl (meth)acrylate, 2-methyl-1-hexyl (meth)acrylate, 3,5,5-trimethyl-1-hexyl (meth)acrylate, cyclohexyl (meth)acrylate, 3,3,5-trimethylcyclohexyl (meth) acrylate, 3-heptyl (meth)acrylate, n-octyl (meth)acrylate, isooctyl (meth)acrylate, 2-octyl (meth)acrylate, 2-ethyl-1-hexyl (meth)acrylate, isobornyl (meth)acrylate, n-decyl (meth)acrylate, isodecyl (meth)acrylate, 2-propylheptyl (meth)acrylate, isononyl (meth)acrylate, n-dodecyl (meth) acrylate (i.e., lauryl (meth)acrylate), n-tridecyl (meth)acrylate, isotridecyl (meth)acrylate, stearyl methacrylate, 3,7-dimethyl-octyl (meth)acrylate, 1-octadecyl (meth)acrylate, 17-methyl-1-heptadecyl (meth)acrylate, and 1-tetradecyl (meth)acrylate. Some exemplary branched alkyl (meth)acrylates are (meth)acrylic acid esters of Guerbet alcohols having 12 to 32 carbon atoms as described in PCT Patent Application Publication WO 2011/119363 (Clapper et al.).

Suitable aryl (meth)acrylates often have an aryl group that has 6 to 20 carbon atoms or 6 to 12 carbon atoms. Suitable aryl substituted alkyl (meth)acrylates often have an alkyl group with 1 to 10 carbon atoms or 1 to 6 carbon atoms and an aryl group with 6 to 20 carbon atoms or 6 to 12 carbon atoms. Suitable aryloxy substituted alkyl (meth)acrylates often have an alkyl group with 1 to 10 carbon atoms or 1 to 6 carbon atoms and an aryloxy group with 6 to 20 carbon atoms or 6 to 12 carbon atoms. As used herein, the term "aryl" refers to a monovalent group that includes at least one aromatic carbocyclic ring. The aryl group can include additional ring structures fused or bonded to the aromatic carbocyclic ring. Any additional ring structures can be saturated, partially unsaturated, or unsaturated. As used herein, the term "aryloxy" refers to a monovalent group of formula —OAr where Ar is an aryl group as defined above. Examples of aryl substituted alkyl (meth)acrylates or aryloxy substituted alkyl (meth)acrylates include 2-biphenylhexyl (meth)acrylate, benzyl (meth)acrylate, and 2-phenoxy ethyl (meth)acrylate. An example aryl (meth)acrylate is phenyl (meth)acrylate.

If present, any of the non-polar (meth)acrylate esters can be present in any suitable amount. Such monomers can be present in amounts up to 80 weight percent, up to 70 weight percent, up to 60 weight percent, or up to 50 weight percent based on a total weight of polymerized material. For example, the non-polar (meth)acrylate esters can be present in an amount in a range of 0 to 80 weight percent, in a range of 0.5 to 80 weight percent, in a range of 0 to 70 weight percent, in a range of 1 to 70 weight percent, in a range of 0 to 60 weight percent, in a range of 1 to 60 weight percent, in a range of 0 to 50 weight percent, 1 to 50 weight percent, in a range of 0 to 40 weight percent, in a range of 1 to 40 weight percent, in a range of 0 to 30 weight percent, in a range of 1 to 30 weight percent, in a range of 0 to 20 weight percent, or in a range of 1 to 20 weight percent.

The polymerizable material often includes one or more optional polar monomers as the second monomer. As used herein, the term "polar monomer" refers to a monomer having a single ethylenically unsaturated group and a polar group. The polar group is often contains a hydroxyl group, an acidic group, a primary amido group, a secondary amido group, a tertiary amido group, an amino group, or an ether group (i.e., a group containing at least one alkylene-oxy-alkylene group of formula —R—O—R— where each R is an alkylene having 1 to 4 carbon atoms). The polar group can be in the form of a salt. For example, the acidic group can be in the form of an anion and can have a cationic counter ion. In many embodiments, the cationic counter ion is an alkaline metal ion (e.g., sodium, potassium, or lithium ion), an alkaline earth ion (e.g., calcium, magnesium, or strontium ion), an ammonium ion, or an ammonium ion substituted with one or more alkyl or aryl groups. In other examples, the various amido or amino groups can be in the form of a cation and can have an anionic counter ion. In these embodiments, the anionic counter ion is often a halide, acetate, formate, sulfate, phosphate, or the like.

The combination of the first monomer of Formula (I) with any of these polar second monomers can be used to prepare copolymers with varying tendency towards ester hydrolysis and with varying tendency towards degradation and/or removal from a substrate. The addition of polar second monomers tends to increase the hydrophilic character of the (meth)acrylic-based elastomeric material. The rate of ester hydrolysis tends to increase with an increase in the hydrophilic character.

Exemplary polar monomers with a hydroxyl group include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), hydroxyalkyl (meth)acrylamides (e.g., 2-hydroxyethyl (meth)acrylamide or 3-hydroxypropyl (meth)acrylamide), ethoxylated hydroxyethyl (meth)acrylate (e.g., monomers commercially available from Sartomer (Exton, Pa., USA) under the trade designation CD570, CD571, and CD572), and aryloxy substituted hydroxyalkyl (meth)acrylates (e.g., 2-hydroxy-2-phenoxypropyl (meth)acrylate).

Exemplary polar monomers with an acidic group can be, for example, a carboxylic acid monomer, a phosphonic acid monomer, a sulfonic acid monomer, a salt thereof, or a combination thereof. Exemplary acidic monomers include, but are not limited to, (meth)acrylic acid, itaconic acid, fumaric acid, crotonic acid, citraconic acid, maleic acid, oleic acid, β-carboxyethyl acrylate, 2-(meth)acrylamidoethanesulfonic acid, 2-(meth)acrylamido-2-methylpropane sulfonic acid, vinylsulfonic acid, and the line. In many embodiments, the polar monomer is (meth)acrylic acid.

Exemplary polar monomers with a primary amido group include (meth)acrylamide. Exemplary polar monomers with secondary amido groups include, but are not limited to, N-alkyl (meth)acrylamides such as N-methyl (meth)acrylamide, N-ethyl (meth)acrylamide, N-isopropyl (meth)acrylamide, N-tert-octyl (meth)acrylamide, and N-octyl (meth)acrylamide. Exemplary polar monomers with a tertiary amido group include, but are not limited to, N-vinyl caprolactam, N-vinyl-2-pyrrolidone, (meth)acryloyl morpholine, and N,N-dialkyl (meth)acrylamides such as N,N-dimethyl (meth)acrylamide, N,N-diethyl (meth)acrylamide, N,N-dipropyl (meth)acrylamide, and N,N-dibutyl (meth)acrylamide.

Polar monomers with an amino group include various N,N-dialkylaminoalkyl (meth)acrylates and N,N-dialkylaminoalkyl (meth)acrylamides. Examples include, but are not limited to, N,N-dimethyl aminoethyl (meth)acrylate, N,N-dimethylaminoethyl (meth)acrylamide, N,N-dimethylaminopropyl (meth)acrylate, N,N-dimethylaminopropyl (meth)acrylamide, N,N-diethylaminoethyl (meth)acrylate, N,N-diethylaminoethyl (meth)acrylamide, N,N-diethylaminopropyl (meth)acrylate, and N,N-diethylaminopropyl (meth)acrylamide.

Exemplary polar monomers with an ether group include, but are not limited to, alkoxylated alkyl (meth)acrylates such as ethoxyethoxyethyl (meth)acrylate, 2-methoxyethyl (meth)acrylate, and 2-ethoxyethyl (meth)acrylate; and poly(alkylene oxide) (meth)acrylates such as poly(ethylene oxide) (meth)acrylates, and poly(propylene oxide) (meth)acrylates. The poly(alkylene oxide) acrylates are often referred to as poly(alkylene glycol) (meth)acrylates. These monomers can have any suitable end group such as a hydroxyl group or an alkoxy group. For example, when the end group is a methoxy group, the monomer can be referred to as methoxy poly (ethylene glycol) (meth)acrylate.

The various polar monomers can be added to increase adhesion of the pressure-sensitive adhesive to an adjacent layer such as backing layer or other type of substrate, to enhance the cohesive strength of the (meth)acrylic-based elastomeric material, or both. Any of the polar monomers or salts thereof can be present in any suitable amounts. If present, the polar monomers are typically used in amounts up to 20 weight percent based on a total weight of polymerizable material used to form the (meth)acrylic-based elastomeric material. This amount can be up to 15 weight percent, up to 10 weight percent, or up to 5 weight percent. For example, the polar monomer can be present in an amount in a range of 0 to 20 weight percent, 0.5 to 20 weight percent, 1 to 20 weight percent, 0 to 15 weight percent, 0.5 to 15 weight percent, 1 to 15 weight percent, 0 to 10 weight percent, 0.5 to 10 weight percent, 1 to 10 weight percent, 0 to 5 weight percent, 0.5 to 5 weight percent, or 1 to 5 weight percent.

The polymerizable material used to form the (meth)acrylic-based elastomeric material may further include one or more other vinyl monomers such as vinyl esters (e.g., vinyl acetate and vinyl propionate); vinyl ethers; styrene or derivatives thereof such as alkyl substituted styrene (e.g., α-methyl styrene); olefinic monomers (e.g., ethylene propylene, or butylene); vinyl halides; or mixtures thereof. These monomers can be polar or non-polar depending on the particular structure. If present, these monomers can be present in any suitable amount. In some embodiments, the vinyl monomers are present in an amount up to 5 weight percent based on a total weight of polymerizable material. For example, the vinyl monomers can be used in amounts up to 4 weight percent, up to 3 weight percent, up to 2 weight percent, or up to 1 weight percent. Some polymerizable compositions contain vinyl monomers in an amount in a range of 0 to 5 weight percent, in a range of 0.5 to 5 weight percent, in a range of 1 to 5 weight percent, in a range of 0 to 3 weight percent, or in a range of 0.5 to 3 weight percent.

A crosslinker monomer having at least two ethylenically unsaturated groups can be used as a second monomer. Although there are other types of crosslinkers in addition to those suitable for use as a second monomer, the use of any type of crosslinker tends to increase the cohesive strength and the tensile strength of the (meth)acrylic-based elastomeric material.

Suitable crosslinkers for use as the second monomer have multiple (meth)acryloyl groups. Crosslinkers with multiple (meth)acryloyl groups can be di(meth)acrylates, tri(meth)acrylates, tetra(meth)acrylates, penta(meth)acrylates, and the like. These crosslinkers can be formed, for example, by reacting (meth)acrylic acid with a polyhydric alcohol (i.e., an alcohol having at least two hydroxyl groups). The polyhydric alcohol often has two, three, four, or five hydroxyl groups. Mixtures of crosslinkers can be used.

In many embodiments, the crosslinkers contain two (meth)acryloyl groups. Exemplary crosslinkers with two (meth)acryloyl groups include 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, polybutadiene di(meth)acrylate, propoxylated glycerin tri(meth)acrylate, and neopentylglycol hydroxypivalate diacrylate modified caprolactone.

Exemplary crosslinkers with three or four (meth)acryloyl groups include, but are not limited to, trimethylolpropane triacrylate (e.g., commercially available under the trade designation TMPTA-N from Cytec Industries, Inc. (Smyrna, Ga., USA) and under the trade designation SR-351 from Sartomer (Exton, Pa., USA)), pentaerythritol triacrylate (e.g., commercially available under the trade designation SR-444 from Sartomer), tris(2-hydroxyethylisocyanurate) triacrylate (e.g., commercially available under the trade designation SR-368 from Sartomer), a mixture of pentaerythritol triacrylate and pentaerythritol tetraacrylate (e.g., commercially available from Cytec Industries, Inc., under the trade designation PETIA with an approximately 1:1 ratio of tetraacrylate to triacrylate and under the trade designation PETA-K with an approximately 3:1 ratio of tetraacrylate to triacrylate), pentaerythritol tetraacrylate (e.g., commercially available under the trade designation SR-295 from Sartomer), di-trimethylolpropane tetraacrylate (e.g., commercially available under the trade designation SR-355 from Sartomer), and ethoxylated pentaerythritol tetraacrylate (e.g., commercially available under the trade designation SR-494 from Sartomer). An exemplary crosslinker with five (meth)acryloyl groups includes, but is not limited to, dipentaerythritol pentaacrylate (e.g., commercially available under the trade designation SR-399 from Sartomer).

In some embodiments, the crosslinker is a polymeric material that contains at least two (meth)acryloyl groups. For example, the crosslinker can be a poly(alkylene oxide) with at least two acryloyl groups (e.g., polyethylene glycol diacrylates are commercially available from Sartomer such as SR210, SR252, and SR603) or a polyurethane with at least two (meth)acryloyl groups (e.g., polyurethane diacrylates such as CN9018 from Sartomer). As the molecular weight of the crosslinker increases, the resulting (meth)acrylic-based elastomeric material tends to have a higher elongation before breaking. Polymeric crosslinkers tend to be used in greater weight percent amounts compared to their non-polymeric counterparts.

For applications where degradation and/or removal of the pressure-sensitive adhesive is desired at the end of its useful life, crosslinkers with ester linkages other than those associated with an ethylenically unsaturated group are desirable. That is, the use of these crosslinkers can enhance the rate of ester hydrolysis of the (meth)acrylic-based elastomeric material. Such crosslinkers can be of Formula (X).

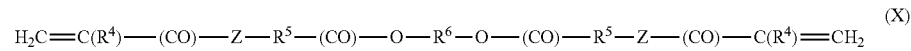

$$H_2C = C(R^4) - (CO) - Z - R^5 - (CO) - O - R^6 - O - (CO) - R^5 - Z - (CO) - C(R^4) = CH_2 \quad (X)$$

In Formula (X), each group $R^4$ is hydrogen or methyl. Each group $R^5$ is an alkylene having 1 to 20 carbon atoms (e.g., 1 to 20 carbon atoms, 1 to 12 carbon atoms, 1 to 6 carbon atoms, or 1 to 4 carbon atoms). Group $R^6$ is an alkylene, a poly(alkylene oxide), an arylene, or a combination thereof. Suitable alkylene groups have 1 to 20 carbon atoms (e.g., 1 to 20 carbon atoms, 1 to 12 carbon atoms, 1 to 6 carbon atoms, or 1 to 4 carbon atoms). Suitable poly(alkylene oxide) groups are of formula $-(C_nH_{2n}-O)_x(C_nH_{2n})-$ where x is an integer in a range of 1 to 1000 (e.g., 1 to 500, 1 to 100, 10 to 500, or 10 to 1000). Suitable arylene groups have 6 to 20 carbon atoms, 6 to 12 carbon atoms, or 6 to 10 carbon atoms. The arylene is often phenylene or diphenylene. Each Z is oxy or —NH—. These crosslinkers are further described, for example, in U.S. Pat. No. 7,754,241 (Webb et al.) and U.S. Pat. No. 6,521,431 (Kiser et al.). One specific example of a crosslinker of Formula (X) is 1,4-butyl bis(acryloxy)lactate.

Other types of crosslinkers can be used rather than those having at least two ethylenically unsaturated groups. One type of crosslinker can have multiple groups that react with functional groups (i.e., functional groups that are not ethylenically unsaturated groups) such as acidic groups on the second monomers. For example, crosslinkers with multiple aziridinyl groups can be used that are reactive with carboxyl groups. Exemplary crosslinkers include bis-amide crosslinkers as described in U.S. Pat. No. 6,777,079 (Zhou et al.). These crosslinkers are not considered to be second monomers.

In other methods of crosslinking, photocrosslinkers (e.g., UV photocrosslinkers) are added. Although some photocrosslinkers have ethylenically unsaturated groups (e.g., acryloyl benzophenone) and can be used as the second monomer, most photoinitiators do not have ethylenically unsaturated groups and are not considered to be a second monomer. The photocrosslinkers without ethylenically unsaturated groups are often added after polymerization or after at least some polymerization has occurred. For example, the photocrosslinker can be added after the polymerizable material (e.g., monovalent monomers) has been partially polymerized to form a viscous, syrup-like composition. Suitable photocrosslinkers added after polymerization or partial polymerization include, for example, multifunctional benzophenones, triazines (such as 2,4,-bis(trichloromethyl)-6-(4-methoxyphenyl)-triazine), acetophenones, and the like.

If present and regardless of the specific mechanism of crosslinking, any of the crosslinkers can be used in any suitable amount. In many embodiments, the crosslinker is present in an amount of up to 5 parts by weight based on a total weight of polymerizable material. In some embodiments, the crosslinker is present in an amount up to 4 weight percent, up to 3 weight percent, up to 2 weight percent, or up to 1 weight percent. The crosslinker can be present, for example, in amounts greater than 0.01 weight percent, greater than 0.05 weight percent, or greater than 1 weight percent. In some embodiments, the crosslinker is present in an amount in a range of 0 to 5 weight percent, 0.01 to 5 weight percent, 0.05 to 5 weight percent, 0 to 3 weight percent, 0.01 to 3 weight percent, 0.05 to 3 weight percent, 0 to 1 weight percent, 0.01 to 1 weight percent, or 0.05 to 1 weight percent.

As an alternative to adding crosslinkers (including photocrosslinkers), the (meth)acrylic-based elastomeric material can be crosslinked using high energy electromagnetic radiation such as gamma radiation or electron beam radiation.

In some embodiments, at least a portion of the monomers in the polymerizable material is a plant-based material rather than a petroleum-based material. For example, the first monomer of Formula (I) can be prepared according to Reaction Schemes A and B using plant-based hydroxy carboxylic acid such as glycolic acid and lactic acid for the compound of Formula (V). Lactic acid can be obtained by fermentation processes and glycolic acid can be isolated from some natural sources including sugar cane and sugar beets. Plant-based alcohols of Formula (IV) such as ethanol, 1-butanol, and isobutanol can be used according to Reaction Schemes B, C, and D. These alcohols can be obtained from fermentation processes. Such hydroxyl esters of Formula (II) or halogenated intermediates of Formula (VII) can be combined with a monomer of Formula (III) or (VII) such as (meth)acrylic acid that can also be a plant-based material. For example, glycerol derived from hydrolysis of soybean oil or other triglyceride oils can be converted into (meth)acrylic acid. Alternatively, glucose can be produced by the enzymatic hydrolysis of corn starch to form lactic acid. The lactic acid can then be dehydrated to (meth)acrylic acid. In still another process, glucose can be bio-fermented to 3-hydroxypropionic acid as an intermediate. This intermediate can be dehydrated to form (meth) acrylic acid. These processes are further described in U.S. Patent Application 2009/0270003 A1 (Anderson et al.).

Overall, the polymerizable material used to form the (meth)acrylic-based elastomeric material typically includes 20 to 99.5 weight percent of the first monomer of Formula (I) and 0.5 to 80 weight percent second monomer, 20 to 99 weight percent of the first monomer of Formula (I) and 1 to 80 weight percent of the second monomer, 30 to 95 weight percent of the first monomer of Formula (I) and 5 to 70 weight percent of the second monomer, and 40 to 95 weight percent of the first monomer of Formula (I) and 5 to 30 weight percent of the second monomer. The second monomer can be any of those described above and mixtures of different second monomers can be used. The weight percent is based on a total weight of polymerizable material used to form the (meth) acrylic-based elastomeric material.

In many embodiments, the (meth)acrylic-based elastomeric material is prepared from at least 50 weight percent of the first monomer of Formula (I) and up to 50 weight percent of the second monomer based on a total weight of polymerizable material. Some (meth)acrylic-based elastomeric materials are formed from 50 to 99.5 weight percent of the first monomer and 0.5 to 50 weight percent of the second monomer, 50 to 99 weight percent of the first monomer and 1 to 50 weight percent of the second monomer, 60 to 99 weight percent of the first monomer and 1 to 40 weight percent of the second monomer, 70 to 99 weight percent of the first monomer and 1 to 30 weight percent of the second monomer, 80 to 99 weight percent of the first monomer and 1 to 20 weight percent of the second monomer, 85 to 99 weight percent of the first monomer and 1 to 15 weight percent of the second monomer, or 90 to 99 weight percent of the first monomer and 1 to 10 weight percent of the second monomer.

In some more specific embodiments, the (meth)acrylic-based elastomeric material is prepared from a polymerizable material that includes at least 50 weight percent of the first monomer of Formula (I) and up to 15 weight percent of a second monomer that is a polar monomer. For example, the polymerizable material can include 50 to 99.5 weight percent of the monomer of Formula (I) and 0.5 to 15 weight percent of the polar monomer, 50 to 99 weight percent of the monomer of Formula (I) and 1 to 15 weight percent of the polar monomer, 60 to 99 weight percent of the monomer of Formula (I) and 1 to 15 weight percent of the polar monomer, 70 to 99 weight percent of the monomer of Formula (I) and 1 to 15 weight percent of the polar monomer, 80 to 99 weight percent of the monomer of Formula (I) and 1 to 15 weight percent of the polar monomer, or 85 to 99 weight percent of the monomer of Formula (I) and 1 to 15 weight percent of the polar monomer. Other second monomers such as non-polar monomers, crosslinkers, or both can be added to any of these polymerizable materials to bring the total to 100 weight percent. For example, the polymerizable material can include at least 1 weight percent non-polar monomers such as 1 to 40 weight percent, 1 to 35 weight percent, 1 to 30 weight percent, 1 to 20 weight percent, or 1 to 10 weight percent. As another example, any of the polymerizable materials can include up to 5 weight percent crosslinker with at least two ethylenically unsaturated group such as 0.01 to 5 weight percent, 0.05 to 5 weight percent, or 1 to 5 weight percent. The weight percent is based on a total weight of polymerizable material used to form the (meth)acrylic-based elastomeric material.

An initiator for free radical polymerization is typically added to the various monomers used to form the (meth) acrylic-based elastomeric material. The polymerization initiator can be a thermal initiator, a photoinitiator, or both. Any suitable thermal initiator or photoinitiator known for free radical polymerization reactions can be used. The initiator is typically present in an amount in the range of 0.01 to 5 weight percent, in the range of 0.01 to 2 weight percent, in the range of 0.01 to 1 weight percent, or in the range of 0.01 to 0.5 weight percent based on a total weight of polymerizable material in the first polymerizable mixture.

As used herein, the polymerizable mixture (i.e., polymerizable reaction mixture) refers to the polymerizable material plus any other components added to the polymerizable materials to prepare the polymerized product.

In some embodiments, a thermal initiator is used. Thermal initiators can be water-soluble or water-insoluble (i.e., oil-soluble) depending on the particular polymerization method used. Suitable water-soluble initiators include, but are not limited to, persulfates such as potassium persulfate, ammonium persulfate, sodium persulfate, and mixtures thereof; an oxidation-reduction initiator such as the reaction product of a persulfate and a reducing agent such as a metabisulfite (e.g., sodium metabisulfite) or a bisulfate (e.g., sodium bisulfate); or 4,4'-azobis(4-cyanopentanoic acid) and its soluble salts (e.g., sodium or potassium). Suitable oil-soluble initiators include, but are not limited to, various azo compound such as those commercially available under the trade designation VAZO from E. I. DuPont de Nemours Co. including VAZO 67, which is 2,2'-azobis(2-methylbutane nitrile), VAZO 64, which is 2,2'-azobis(isobutyronitrile), and VAZO 52, which is (2,2'-azobis(2,4-dimethylpentanenitrile); and various peroxides such as benzoyl peroxide, cyclohexane peroxide, lauroyl peroxide, and mixtures thereof.

In many embodiments, a photoinitiator is used. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J., USA) or under the trade designation ESACURE KB-1 from Sartomer (Exton, Pa., USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(0-ethoxycarbonyl)oxime. Other suitable photoinitiators include, for example, 1-hydroxycyclohexyl phenyl ketone (IRGACURE 184), bis(2,4,6-trimethylbenzoyl)phenylphosphineoxide (IRGACURE 819), 1-[4-(2-hydroxyethoxyl)phenyl]-2-hydroxy-2-methyl-1-propane-1-one (IRGACURE 2959), 2-benzyl-2-dimethylamino-1-(4-morpholinophenyl)butanone (IRGACURE 369), 2-methyl-1-[4-(methylthio)phenyl]-2-morpholinopropan-1-one (IRGACURE 907), and 2-hydroxy-2-methyl-1-phenyl propan-1-one (DAROCUR 1173).

The polymerizable mixture may optionally further contain a chain transfer agent to control the molecular weight of the resultant elastomeric material. Examples of useful chain transfer agents include, but are not limited to, carbon tetrabromide, alcohols, mercaptans such as isooctylthioglycolate, and mixtures thereof. If used, the polymerizable mixture may include up to 0.5 weight of a chain transfer agent based on a total weight of polymerizable material. For example, the polymerizable mixture can contain 0.01 to 0.5 weight percent, 0.05 to 0.5 weight percent, or 0.05 to 0.2 weight percent chain transfer agent.

The polymerizable mixture used to form the (meth)acrylic-based elastomeric material can include a organic solvent or can be either free or essentially free of an organic solvent. As used herein, the term "essentially free" in reference to an organic solvent means that the organic solvent is present in an amount less than 5 weight percent, less than 4 weight percent, less than 3 weight percent, less than 2 weight percent, or less than 1 weight percent based on the weight of the polymerizable mixture or polymerizable material. If an organic solvent is included in the polymerizable mixture, the amount is often selected to provide the desired viscosity. Examples of suitable organic solvents include, but are not limited to, methanol, tetrahydrofuran, ethanol, isopropanol, heptane, acetone, methyl ethyl ketone, methyl acetate, ethyl acetate, toluene, xylene, and ethylene glycol alkyl ether. Those solvents can be used alone or as mixtures thereof.

The (meth)acrylic-based elastomeric material can be prepared by a variety of conventional free radical polymerization methods, including solution, bulk (i.e., with little or no solvent), dispersion, emulsion, and suspension processes. The particular method used may be influenced by the use of the final pressure-sensitive adhesive composition. The resulting (meth)acrylic-based elastomeric materials can be random or block copolymers. In many embodiments, the (meth)acrylic-based elastomeric material is a random copolymer.

In a second aspect, a pressure-sensitive adhesive is provided that contains a copolymeric (meth)acrylic-based elastomeric material. The (meth)acrylic-based elastomeric material comprises multiple first units of Formula (XX)

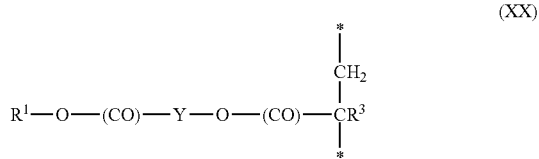

(XX)

and multiple second units of Formula (XXI).

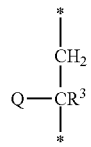

(XXI)

In Formula (XX), group $R^1$ is an alkyl, aryl, or a combination thereof. Group Y is a branched or linear alkylene of formula $-C_n(R^2)_{2n}-$ wherein the group $R^2$ is hydrogen or alkyl and wherein the variable n is an integer in a range of 1 to 12. The second units of Formula (XXI) are derived from a second monomer that is a crosslinker monomer having at least two ethylenically unsaturated groups, a non-polar monomer with a single ethylenically unsaturated group, or a polar monomer with a single ethylenically unsaturated group. Group Q is equal to the second monomer minus a vinyl group ($CH_2=CHR_3-$). In Formulas (XX) and (XXI), group $R^3$ is hydrogen or methyl and the asterisk (*) indicates where each unit is connected to another unit in the copolymeric (meth)acrylic-based elastomeric material.

The multiple first units of Formula (XX) are typically derived from a first monomer of Formula (I). Alternatively, the first units of Formula (XX) can be derived from a precursor of the first monomer of Formula (I). That is, the precursor of a first monomer of Formula (I) can undergo a free radical polymerization with the second monomer to form a copolymeric intermediate that is further reacted to provide a pendant group of formula $R^1-O-(CO)-Y-O-(CO)-$. In some embodiments, the precursor of the first monomer of Formula (I) is (meth)acrylic acid. A copolymer of (meth)acrylic acid and a second monomer such as, for example, an alkyl (meth)acrylate can be prepared. The copolymer can then be reacted with a compound of Formula (VII), which is $R^1-O-(CO)-Y-X$, as described above to form a first unit of Formula (XX). All or any desired portion of the carboxylic acid groups in the copolymer can be reacted with the compound of Formula (VII). In other embodiments, the (meth)acrylic acid homopolymer can be formed and only a portion of the carboxylic acid groups in the homopolymer can be reacted with the compound of Formula (VII).

The multiple second units of Formula (XXI) are derived from a second monomer that is polar monomer having a single ethylenically unsaturated group, a non-polar monomer having a single ethylenically unsaturated group, or a crosslinker monomer. Any of the monomers described above can be used as the second monomer. Group Q is the second monomer minus a vinyl group. When the second monomer is a non-polar alkyl (meth)acrylate with a single ethylenically unsaturated group, group Q can be of formula $-(CO)-O-R^7$ where $R^7$ is an alkyl. When the second monomer is (meth)acrylic acid, group Q can be of formula $-(CO)-O-OH$.

In some embodiments, the (meth)acrylic-based elastomeric materials themselves may function as a pressure-sensitive adhesive. In other embodiments, one or more tackifiers, one or more plasticizers, or a mixture thereof can be combined with the elastomeric materials. Tackifiers (i.e., tackifying agents or tackifying resins) and plasticizers (i.e., plasticizing agents) are often added to modulate the $T_g$, modulate the storage modulus, and to alter the tackiness of the pressure-sensitive adhesive. The tackifier is typically selected to be miscible with the (meth)acrylic-based elastomeric material. Either solid or liquid tackifiers can be added. Solid tackifiers generally have a number average molecular weight (Mn) of 10,000 grams per mole or less and a softening point above about 70° C. Liquid tackifiers are viscous materials that have a softening point of about 0° C. to about 70° C.

Suitable tackifying resins include rosin resins such as rosin acids and their derivatives (e.g., rosin esters); terpene resins such as polyterpenes (e.g., alpha pinene-based resins, beta pinene-based resins, and limonene-based resins) and aromatic-modified polyterpene resins (e.g., phenol modified polyterpene resins); coumarone-indene resins; and petroleum-based hydrocarbon resins such as C5-based hydrocarbon resins, C9-based hydrocarbon resins, C5/C9-based hydrocarbon resins, and dicyclopentadiene-based resins. These tackifying resins, if added, can be hydrogenated to lower their color contribution to the pressure-sensitive adhesive composition. Combinations of various tackifiers can be used, if desired. In many embodiments, the tackifier is a rosin ester or includes a rosin ester.

Tackifiers that are rosin esters are the reaction products of various rosin acids and alcohols. These include, but are not limited to, methyl esters of rosin acids, triethylene glycol esters of rosin acids, glycerol esters of rosin acids, and pentaerytythritol esters of rosin acids. These rosin esters can be hydrogenated partially or fully to improve stability and reduce their color contribution to the pressure-sensitive adhesive composition. The rosin resin tackifiers are commercially available, for example, from Eastman Chemical Company (Kingsport, Tenn., USA) under the trade designations PERMALYN, STAYBELITE, and FORAL as well as from Newport Industries (London, England) under the trade designations NUROZ and NUTAC. A fully hydrogenated rosin resin is commercially available, for example, from Eastman Chemical Company under the trade designation FORAL AX-E. A partially hydrogenated rosin resin is commercially available, for example, from Eastman Chemical Company under the trade designation STAYBELITE-E.

Tackifiers that are hydrocarbon resins can be prepared from various petroleum-based feed stocks. These feedstocks can be aliphatic hydrocarbons (mainly C5 monomers with some other monomers present such as a mixture of trans-1,3-pentadiene, cis-1,3-pentadiene, 2-methyl-2-butene, dicyclopentadiene, cyclopentadiene, and cyclopentene), aromatic hydrocarbons (mainly C9 monomers with some other monomers present such as a mixture of vinyl toluenes, dicyclopentadiene, indene, methylstyrene, styrene, and methylindenes), or mixtures thereof. Tackifiers derived from C5 monomers are referred to as C5-based hydrocarbon resins while those derived from C9 monomers are referred to as C9-based hydrocarbon resins. Some tackifiers are derived from a mixture of C5 and C9 monomers or are a blend of C5-based hydrocarbon tackifiers and C9-based hydrocarbon tackifiers. These tackifiers can be referred to as C5/C9-based hydrocarbon tackifiers. Any of these resins can be partially or fully hydrogenated to improve their color and thermal stability.

The C5-based hydrocarbon resins are commercially available from Eastman Chemical Company under the trade designations PICCOTAC and EASTOTAC, from Cray Valley (Exton, Pa., USA) under the trade designation WINGTACK, from Neville Chemical Company (Pittsburgh, Pa., USA) under the trade designation NEVTAC LX, and from Kolon Industries, Inc. (South Korea) under the trade designation HIKOREZ. The C5-based hydrocarbon resins are commercially available from Eastman Chemical with various degrees of hydrogenation under the trade designation EASTOTACK.

The C9-based hydrocarbon resins are commercially available from Eastman Chemical Company under the trade designation PICCO, KRISTLEX, PLASTOLYN, and PICCOTAC, and ENDEX, from Cray Valley (Exton, Pa., USA) under the trade designations NORSOLENE, from Ruetgers N. V. (Belgium) under the trade designation NOVAREZ, and from Kolon Industries, Inc. (South Korea) under the trade designation HIKOTAC. These resins can be partially or fully hydrogenated. Prior to hydrogenation, the C9-based hydrocarbon resins are often about 40 percent aromatic as measured by proton Nuclear Magnetic Resonance. Hydrogenated C9-based hydrocarbon resins are commercially available, for example, from Eastman Chemical under the trade designations REGALITE and REGALREX that are 50 to 100 percent (e.g., 50 percent, 70 percent, 90 percent, and 100 percent) hydrogenated. The partially hydrogenated resins typically have some aromatic rings.

Various C5/C9-based hydrocarbon tackifiers are commercially available from Arakawa (Germany) under the trade designation ARKON, from Zeon Corporation (Japan) under the trade designation QUINTONE, from Exxon Mobile Chemical (Houston, Tex.) under the trade designation ESCOREZ, and from Newport Industries (London, England) under the trade designations NURES and H-REZ.

Any of the tackifiers may be used in any suitable amount. In some embodiments, particularly in those embodiments where degradation of the pressure-sensitive adhesive is desired for ease of removal, polymerizable mixtures without tackifier or with only a small amount of tackifier are often desired. The tackifiers typically are not degradable under the basic conditions that can be used to degrade and/or remove the (meth) acrylic-based elastomeric material. In other embodiments, it may be desirable to include up to 60 weight percent, up to 50 weight percent, up to 40 weight percent, or up to 30 weight percent tackifier based on a total weight of the (meth)acrylic-based elastomeric material. For example, the tackifier can be present in an amount in a range of 0 to 60 weight percent, 1 to 60 weight percent, 0 to 50 weight percent, 1 to 50 weight percent, 0 to 40 weight percent, 1 to 40 weight percent, 0 to 30 weight percent, 1 to 30 weight percent, 0 to 20 weight percent, or 1 to 20 weight percent based on a total weight of the (meth)acrylic-based elastomeric material.

Some pressure-sensitive adhesive compositions can include one or more plasticizers. The plasticizer is typically selected to be compatible with (i.e., miscible with) the other components in the composition such as the (meth)acrylic-based elastomeric material and any optional tackifier. Suitable plasticizers include, but are not limited to, various polyalkylene oxides (e.g., polyethylene oxides or propylene oxides), adipic acid esters, formic acid esters, phosphoric acid esters, benzoic acid esters, phthalic acid esters, sulfonamides, and naphthenic oils. For pressure-sensitive adhesives that desirably can be degraded and/or removed under basic conditions, the plasticizer is often selected to include an ester or other group that can be reacted under such conditions. The plasticizers can be used in any desired amount such as in a range of 0 to 100 weight percent or in the range of 1 to 100 weight percent based on a weight of the (meth)acrylic-based elastomeric material. For example, the plasticizer can be in a range of 0 to 50 weight percent, 5 to 50 weight percent, 1 to 25 weight percent, 5 to 25 weight percent, or 1 to 10 weight percent based on a total weight of the (meth)acrylic-based elastomeric material.

The polymerizable mixture can further include other optional components such as, for example, pigments, glass beads, polymer beads (e.g., expandable beads or expanded beads), hydrophobic or hydrophilic silica, calcium carbonate, fibers (e.g., glass, polymeric material, ceramic material, or mixtures thereof), blowing agents, fire retardants, oxidants, and stabilizers. These optional components can be added in any amount sufficient to obtain the properties desired to the particular use of the pressure-sensitive adhesive.

In some methods of preparing the pressure-sensitive adhesive, the polymerizable mixture containing the monomers used to form the (meth)acrylic-based elastomeric material are partially polymerized to increase the viscosity to that corresponding to a syrup-like material. Often, the monomer of Formula (I) and any monovalent second monomers are mixed with a portion of the free radical polymerization initiator.

Depending on the type of initiator added, the mixture is exposed to actinic radiation or heat to partially polymerize the monovalent monomers (i.e., monomers with a single ethylenically unsaturated group). Then, the crosslinker or photocrosslinker and any remaining portion of the initiator are added to the syrup-like, partially polymerized material. Optional tackifiers and plasticizers can also be combined with the partially polymerized material. The resulting mixture can be more readily applied as a coating layer onto a substrate such as support (e.g., release liner) or another layer (e.g., backing layer). The coating layer can then be exposed to actinic radiation if a photoinitiator is present or to heat if a thermal initiator is present. Exposure to actinic radiation or heat results in the further reaction of polymerizable material within the coating layer and the formation of a pressure-sensitive adhesive layer.

In another aspect, an article is provided that includes a pressure-sensitive adhesive layer and a substrate positioned adjacent to the pressure-sensitive adhesive layer. The pressure-sensitive adhesive layer contains the (meth)acrylic-based elastomeric material defined above. As used herein, the term "adjacent" refers to a first layer in contact with a second layer or separated from the second layer by one or more additional layers. For example, the pressure-sensitive adhesive can contact the substrate or be separated from the substrate by an intervening primer layer or adhesion promoting layer. The articles can have a single pressure-sensitive adhesive layer or can have multiple pressure-sensitive adhesive layers. Any of these articles can include a single substrate or can have multiple substrates. Any particular substrate can be a single layer of material or can have a multi-layer construction.

The pressure-sensitive adhesive is typically adhered to the substrate although the strength of the adherence can vary. In the case of a release liner substrate, the adherence is purposefully low. The substrates can be flexible or inflexible and can be formed of a polymeric material, glass or ceramic material, metal, or combinations thereof. Suitable polymeric substrates include, but are not limited to, polymeric films such as those prepared from polypropylene, polyethylene, polyvinyl chloride, polyester (e.g., polyethylene terephthalate, polyethylene naphthalate, and various aliphatic polyesters), polycarbonate, polymethyl(meth)acrylate (PMMA), polyurethane, cellulose acetate, cellulose triacetate, and ethyl cellulose. Foam backings may be used. Examples of other substrates include, but are not limited to, metal such as stainless steel, metal or metal oxide coated polymeric material, metal or metal oxide coated glass, and the like. When the pressure-sensitive adhesive is laminated to the substrate, it may be desirable to treat the surface of the substrate to improve the adhesion. Such treatments are typically selected based on the nature of the materials in the pressure-sensitive adhesive composition and of the substrate and include primers and surface modifications (e.g., corona treatment and surface abrasion).

The substrate to which the pressure-sensitive adhesive can be applied is selected depending on the particular application. The pressure-sensitive adhesive layer may be used in any article conventionally known to use such compositions such as labels, tapes, signs, covers, marking indices, display components, touch panels, decorative sheets, and the like. Flexible backing materials having microreplicated surfaces are also contemplated.

The pressure-sensitive adhesive can be provided in the form of a pressure-sensitive adhesive transfer tape in which at least one layer of the pressure-sensitive adhesive is disposed on a release liner for application to a permanent substrate at a later time. The pressure-sensitive adhesive composition can also be provided as a single coated or double coated tape in which the adhesive is disposed on a permanent backing. Backings can be made from plastics (e.g., polypropylene, including biaxially oriented polypropylene, polyvinyl chloride, polyvinyl acetate, polyethylene, polyester (e.g., polyethylene terephthalate, polyethylene naphthalate, and various aliphatic polyesters), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the pressure-sensitive adhesive on one or both sides of the foam, or the pressure-sensitive adhesive may be laminated to it.

In some embodiments, the backing for a pressure-sensitive adhesive tape is an aliphatic polyester. Particularly useful aliphatic polyesters are those formed from plant-based materials such polylactic acid. Polylactic acid can be prepared by ring-opening polymerization of the lactic acid dimer, lactide. Lactic acid and optically active and the dimer appears in four different forms: L,L-lactide, D,L-lactide, D,D-lactide, and a racemic mixture of L,L-lactide and D,D-lactide. Copolymers of lactic acid with other co-monomers can also be used. Example co-monomers include glycolide, beta-propiolactone, tetramethyglycolide, beta-butyrolactone, gamma-butyrolactone, pivalolactone, 2-hydroxybutyric acid, alpha-hydroxyisobutyric acid, alpha-hydroxyvaleric acid, alpha-hydroxyisovaleric acid, alpha-hydroxycaproic acid, alpha-hydroxyethylbutyric acid, alpha-hydroxyisocaproic acid, alpha-hydroxy-beta-methylvaleric acid, alpha-hydroxyoctanoic acid, alpha-hydroxydecanoic acid, alpha-hydroxymyristic acid, and alpha-hydroxystearic acid.

For a single-sided tape, the pressure-sensitive adhesive is applied to one surface of the backing material and a suitable release material is applied to the opposite surface of the backing material. Release materials are known and include materials such as, for example, silicones, polyethylenes, polycarbamates, polyacrylics, and the like. For double coated tapes, the pressure-sensitive adhesive is applied to one surface of the backing material and a second adhesive is disposed on the opposite surface of the backing material. The second adhesive can be identical to the pressure-sensitive adhesive (i.e., the pressure-sensitive includes a (meth)acrylic-based elastomeric material formed using a monomer of Formula (I) plus a second monomer) can be similar to the pressure-sensitive adhesive (e.g., the same (meth)acrylic-based elastomeric material in a different formulation), or can be different than the pressure-sensitive adhesive (a different type of adhesive or a different (meth)acrylic-based elastomeric material). Double coated tapes are often carried on a release liner.

The pressure-sensitive adhesive layers can be coated on a substrate using any conventional coating techniques modified as appropriate to the particular substrate. For example, the polymerizable mixtures used to form the pressure-sensitive adhesive layers can be applied to a variety of solid substrates by methods such as roller coating, flow coating, dip coating, spin coating, spray coating, knife coating, and die coating. These various methods of coating allow the pressure-sensitive adhesive layers to be placed on the substrate at variable thicknesses thus allowing a wider range of use of the articles that are formed.

Any suitable thickness can be used for the pressure-sensitive adhesive layer or layers. In many embodiments, each pressure-sensitive adhesive layer has a thickness no greater than 20 mils (500 micrometers), no greater than 10 mils (250 micrometers), no greater than 5 mils (125 micrometers), no greater than 4 mils (100 micrometers), no greater than 3 mils (75 micrometers), or no greater than 2 mils (50 micrometers). The thickness of the pressure-sensitive adhesive layer is often at least 0.5 mils (12.5 micrometers) or at least 1 mil (25 micrometers). For example, the thickness of the pressure-sensitive adhesive layer can be in the range of 0.5 mils (2.5 micrometers) to 20 mils (500 micrometers), in the range of 0.5 mils (5 micrometers) to 10 mils (250 micrometers), in the range of 0.5 mils (12.5 micrometers) to 5 mils (125 micrometers), in the range of 1 mil (25 micrometers) to 3 mils (75 micrometers), or in the range of 1 mil (25 micrometers) to 2 mils (50 micrometers).

The (meth)acrylic-based elastomeric material included in the pressure-sensitive adhesive layer can undergo ester hydrolysis in an aqueous solution having a pH greater than 7 within 24 hours when held at a temperature of 80° C. This ester hydrolysis results in the degradation of the polymeric material (i.e., the copolymeric (meth)acrylic-based elastomeric material) and/or removal of the polymeric material from a substrate to which it is adhered. The pressure-sensitive adhesive may separate from the substrate to which it is adhered, may undergo degradation and/or dissolution, or a combination thereof. In some embodiments, the pressure-sensitive adhesive is removable as a film from the substrate. In other embodiments, the pressure-sensitive adhesive tends to degrade and/or dissolve sufficiently that it is no longer a film.

The composition of the (meth)acrylic-based elastomeric material can be selected to provide the desired ease of ester hydrolysis. The ester hydrolysis can be varied by altering the chemical structure of the first monomer of Formula (I) and by selection of both the type and amount of the second monomer. Branching within the first monomer typically tends to decrease the rate of ester hydrolysis. That is, a linear first monomer with the same number of carbon atoms as a branched first monomer tends to undergo ester hydrolysis more readily. Further, increasing the hydrophobic character of the (meth)acrylic-based elastomeric material tends to decrease the rate of ester hydrolysis. The hydrophobic character can be increased by increasing the amount of non-polar second monomer in the polymerizable material. Conversely, increasing the hydrophilic character of (meth)acrylic-based elastomeric material tends to increase the rate of hydrolysis. The hydrophobic character can be increased by adding a polar second monomer. Increasing the amount of a polar second monomer or decreasing the amount of a non-polar second monomer in the copolymer tends to increase the rate of ester hydrolysis. Still further, using a crosslinker monomer such as those of Formula (X) tends to favor ester hydrolysis of the (meth)acrylic-based elastomeric material.

Various items are provided that are pressure-sensitive adhesive compositions or articles that contain the pressure-sensitive adhesive composition.

Embodiment 1 is a pressure-sensitive adhesive that contains a copolymeric (meth)acrylic-based elastomeric material. The (meth)acrylic-based elastomeric material comprises a reaction product of a polymerizable material that contains (a) a first monomer of Formula (I)

$$R^1-O-(CO)-Y-O-(CO)-C(R^3)=CH_2 \quad (I)$$

and (b) a second monomer having an ethylenically unsaturated group. In Formula (I), group $R^1$ is an alkyl, aryl, or a combination thereof. Group Y is a branched or linear alkylene of formula $-C_n(R^2)_{2n}-$ wherein the group $R^2$ is hydrogen or alkyl and wherein the variable n is an integer in a range of 1 to 12. Group $R^3$ is hydrogen or methyl.

Embodiment 2 is the pressure-sensitive adhesive of embodiment 1, wherein the (meth)acrylic-based elastomeric material has a glass transition temperature ($T_g$) no greater than 10° C.

Embodiment 3 is the pressure-sensitive adhesive of embodiment 1 or 2, wherein the first monomer of Formula (I) is of Formula (Ia) or (Ic)

$$R^1-O-(CO)-C_nH_{2n}-O-(CO)-C(R^3)=CH_2 \quad (Ia)$$

$$R^1-O-(CO)-C_nH_p(R^{2a})_q-O-(CO)-C(R^3)=CH_2 \quad (Ic)$$

In these formulas, $R^{2a}$ is an alkyl, the variable p is an integer equal to at least zero, the variable q is n integer equal to at least 1, and the sum (p+q) is equal to 2n.

Embodiment 4 is the pressure-sensitive adhesive of embodiment 1 or 2, wherein the first monomer of Formula (I) is of Formula (Ib), (Id), or (Ie)

$$R^1-O-(CO)-CH_2-O-(CO)-C(R^3)=CH_2 \quad (Ib)$$

$$R^1-O-(CO)-CHR^{2a}-O-(CO)-C(R^3)=CH_2 \quad (Id)$$

$$R^1-O-(CO)-C(R^{2a})_2-O-(CO)-C(R^3)=CH_2 \quad (Ie)$$

wherein $R^{2a}$ is an alkyl.

Embodiment 5 is the pressure-sensitive adhesive of any one of embodiments 1 to 4, wherein $R^3$ is hydrogen.

Embodiment 6 is the pressure-sensitive adhesive of any one of embodiments 1 or 2, wherein the first monomer is $CH_3CH_2CH_2CH_2-O-(CO)-CH_2-O-(CO)-CH_2=CH_2$ or $CH_3CH_2CH_2CH_2-O-(CO)-CH(CH_3)-O-(CO)-CH_2=CH_2$.

Embodiment 7 is the pressure-sensitive adhesive of any one of embodiments 1 to 6, wherein the polymerizable material comprises 20 to 99.5 weight percent of the first monomer of Formula (I) and 0.5 to 80 weight percent of the second monomer based on a total weight of polymerizable material.

Embodiment 8 is the pressure-sensitive adhesive of any one of embodiments 1 to 7, wherein the second monomer is a crosslinker monomer having at least two ethylenically unsaturated groups, a non-polar monomer with a single ethylenically unsaturated group, a polar monomer with a single ethylenically unsaturated group, or a mixture thereof.

Embodiment 9 is the pressure-sensitive adhesive of embodiment 8, wherein the polymerizable material comprises at least 50 weight percent of the first monomer of Formula (I) and up to 15 weight percent of the polar monomer based on a total weight of polymerizable material.

Embodiment 10 is the pressure-sensitive adhesive of embodiment 9, further comprising up to 5 weight percent of the crosslinker monomer.

Embodiment 11 is the pressure-sensitive adhesive of any one of embodiments 1 to 10, wherein $R^1$ is an alkyl having at least 4 carbon atoms.

Embodiment 12 is the pressure-sensitive adhesive of any one of embodiments 1 to 11, wherein pressure-sensitive adhesive undergoes ester hydrolysis in an aqueous solution having a pH greater than 7 at 80° C. within 24 hours.

Embodiment 13 is the pressure-sensitive adhesive of embodiment 1, wherein the first monomer of Formula (I) is $CH_3CH_2CH_2CH_2-O-(CO)-CH_2-O-(CO)-CH_2=CH_2$, $CH_3CH_2CH_2CH_2CH_2CH_2-O-(CO)-CH_2-O-(CO)-CH_2=CH_2$, $CH_3CH_2CH_2CH_2CH(CH_2CH_3)CH_2-O-(CO)-CH_2-O-(CO)-CH_2=CH_2$, $CH_3CH_2-O-(CO)-CH(CH_3)-O-(CO)-CH_2=CH_2$, $CH_3CH_2-O-(CO)-C(CH_3)_2-O-(CO)-CH_2=CH_2$, $CH_3CH_2CH_2CH_2-O-(CO)-CH(CH_3)-O-(CO)-CH_2=CH_2$, $CH_3CH_2CH_2CH_2CH_2CH_2-O-(CO)-CH(CH_3)-O-(CO)-CH_2=CH_2$, $CH_3CH_2CH_2CH_2CH_2CH_2CH_2CH_2-O-(CO)-CH(CH_3)-O-(CO)-CH_2=CH_2$, $CH_3CH_2CH_2CH_2CH(CH_2CH_3)CH_2-O-(CO)-CH(CH_3)-O-(CO)-CH_2=CH_2$, $CH_3CH_2CH_2CH_2CH_2CH_2CH(CH_3)$—O—(CO)—CH$(CH_3)$—O—(CO)—$CH_2$=$CH_2$, $CH_3CH_2$—O—(CO)—$CH_2CH_2CH_2CH_2CH_2$—O—(CO)—$CH_2$=$CH_2$, $CH_3CH_2CH_2CH_2$—O—(CO)—$CH_2CH(CH_3)$—O—(CO)—$CH_2$=$CH_2$, or $CH_3CH_2CH_2CH_2$—O—(CO)—CH$(CH_2CH_2CH_2CH_3)$—O—(CO)—$CH_2$=$CH_2$.

Embodiment 14 is a pressure-sensitive adhesive that contains a copolymeric (meth)acrylic-based elastomeric material. The (meth)acrylic-based elastomeric material comprises multiple first units of Formula (XX)

$$\overset{*}{\underset{*}{\underset{|}{R^1-O-(CO)-Y-O-(CO)-\overset{|}{\underset{|}{CR^3}}}}}\overset{CH_2}{\underset{|}{|}} \qquad (XX)$$

and multiple second units of Formula (XXI).

$$\overset{*}{\underset{*}{\underset{|}{Q-\overset{|}{\underset{|}{CR^3}}}}}\overset{CH_2}{\underset{|}{|}} \qquad (XXI)$$

In Formula (XX), group $R^1$ is an alkyl, aryl, or a combination thereof. Group Y is a branched or linear alkylene of formula —$C_n(R^2)_{2n}$— wherein the group $R^2$ is hydrogen or alkyl and wherein the variable n is an integer in a range of 1 to 12. The second units of Formula (XXI) are derived from a second monomer that is a crosslinker monomer having at least two ethylenically unsaturated groups, a non-polar monomer with a single ethylenically unsaturated group, or a polar monomer with a single ethylenically unsaturated group. Group Q is equal to the second monomer minus a vinyl group ($CH_2$=$CHR^3$—). In Formulas (XX) and (XXI), group $R^3$ is hydrogen or methyl and the asterisk (*) indicates where each unit is connected to another unit in the copolymeric (meth)acrylic-based elastomeric material.

Embodiment 15 is the pressure-sensitive adhesive of embodiment 14, wherein the (meth)acrylic-based elastomeric material has a glass transition temperature ($T_g$) no greater than 10° C.

Embodiment 16 is the pressure-sensitive adhesive of embodiment 14 or 15, wherein group $R^1$—O—(CO)—Y—O—(CO)— of the first units of Formula (XX) is $R^1$—O—(CO)—$C_nH_{2n}$—O—(CO)— or $R^1$—O—(CO)—$C_nH_p$$(R^{2a})_q$—O—(CO)— wherein $R^{2a}$ is an alkyl, the variable p is an integer equal to at least zero, the variable q is n integer equal to at least 1, and the sum (p+q) is equal to 2n.

Embodiment 17 is the pressure-sensitive adhesive of embodiment 14 or 15, wherein group $R^1$—O—(CO)—Y—O—(CO)— of the first units of Formula (XX) is $R^1$—O—(CO)—$CH_2$—O—(CO)—, $R^1$—O—(CO)—$CHR^{2a}$—O—(CO)—, or $R^1$—O—(CO)—$C(R^{2a})_2$—O—(CO)— wherein $R^{2a}$ is an alkyl.

Embodiment 18 is the pressure-sensitive adhesive of any one of embodiments 14 to 17, wherein $R^3$ is hydrogen.

Embodiment 19 is the pressure-sensitive adhesive of any one of embodiments 14 or 15, wherein group $R^1$—O—(CO)—Y—O—(CO)— of the first units of Formula (XX) is $CH_3CH_2CH_2CH_2$—O—(CO)—$CH_2$—O—(CO)— or $CH_3CH_2CH_2CH_2$—O—(CO)—CH$(CH_3)$—O—(CO)—.

Embodiment 20 is the pressure-sensitive adhesive of any one of embodiments 14 to 19, wherein the polymerizable material comprises 20 to 99.5 weight percent of the first units of Formula (XX) and 0.5 to 80 weight percent of the second units of Formula (XXI).

Embodiment 21 is the pressure-sensitive adhesive of any one of embodiments 14 to 20, wherein group Q is equal to a polar monomer minus a vinyl group or to a non-polar monomer minus a vinyl group.

Embodiment 22 is the pressure-sensitive adhesive of any one of embodiments 14 to 21, wherein the pressure-sensitive adhesive undergoes ester hydrolysis in an aqueous solution having a pH greater than 7 at 80° C. within 24 hours.

Embodiment 23 is the pressure-sensitive adhesive of any one of embodiments 14 to 22, wherein group $R^1$—O—(CO)—Y—O—(CO)— of the first units of Formula (XX) is $CH_3CH_2CH_2CH_2$—O—(CO)—$CH_2$—O—(CO)—, $CH_3CH_2CH_2CH_2CH_2CH_2CH_2CH_2$—O—(CO)—$CH_2$—O—(CO)—, $CH_3CH_2CH_2CH_2CH(CH_2CH_3)CH_2$—O—(CO)—$CH_2$—O—(CO)—, $CH_3CH_2$—O—(CO)—CH$(CH_3)$—O—(CO)—, $CH_3CH_2$—O—(CO)—C$(CH_3)_2$—O—(CO)—, $CH_3CH_2CH_2CH_2$—O—(CO)—CH$(CH_3)$—O—(CO)—, $CH_3CH_2CH_2CH_2CH_2CH_2$—O—(CO)—CH$(CH_3)$—O—(CO)—, $CH_3CH_2CH_2CH_2CH_2CH_2CH_2CH_2$—O—(CO)—CH$(CH_3)$—O—(CO)—, $CH_3CH_2CH_2CH(CH_2CH_3)CH_2$—O—(CO)—CH$(CH_3)$—O—(CO)—, $CH_3CH_2CH_2CH_2CH_2CH(CH_3)$—O—(CO)—CH$(CH_3)$—O—(CO)—, $CH_3CH_2$—O—(CO)—$CH_2CH_2CH_2CH_2CH_2$—O—(CO)—, $CH_3CH_2CH_2CH_2$—O—(CO)—$CH_2CH(CH_3)$—O—(CO)—, or $CH_3CH_2CH_2CH_2$—O—(CO)—CH$(CH_2CH_2CH_2CH_3)$—O—(CO)—.

Embodiment 24 is an article that includes a pressure-sensitive adhesive layer and a substrate positioned adjacent to the pressure-sensitive adhesive layer. The pressure-sensitive adhesive layer is any of these in embodiments 1 to 23.

Embodiment 25 is an article of embodiment 24, wherein the article is an adhesive tape or a transfer tape.

Embodiment 26 is an article of embodiment 24 or 25, wherein the pressure-sensitive adhesive undergoes ester hydrolysis in an aqueous solution having a pH greater than 7 at 80° C. within 24 hours.

EXAMPLES

Materials

The following materials were obtained from Aldrich (Milwaukee, Wis., USA): butyl glycolate, acryloyl chloride, bromoacetic acid, ethyl lactate, 1-butyl lactate, 2-chloropropionic acid, 2-bromohexanoic acid, ethyl-2-hydroxy isobutyrate, sodium borohydride, ethyl-6-hydroxyhexanoate, 1,4-butanediol, and 2-bromopropionic acid.

The following materials were obtained from EDM Chemicals (Philadelphia, Pa., USA): toluene, triethylamine, methylene chloride, and dimethylformamide.

The following materials were obtained from VWR (Radnor, Pa., USA): ethyl acetate and potassium carbonate.

The following materials were obtained from Alfa Aesar (Ward Hill, Mass., USA): glycolic acid (70 weight percent solution in water), 1-octyl alcohol, methanesulfonic acid, 2-ethylhexanol, acrylic acid, 1-hexanol, 1-butanol, and tetrabutylammonium hydroxide.

The following material was obtained from Purac (Netherlands): 2-ethyl hexyl lactate (available under the trade designation PURASOLV EHL).

CELITE is a trade designation for a diatomaceous earth filter agent that was obtained from Imerys Filtration (San Jose, Calif., USA).

IRGACURE 651 is a trade designation for 2,2-dimethoxy-1,2-diphenylethan-1-one that was obtained from BASF (Florham Park, N.J., USA). This was used as a photoinitiator.

DAROCUR 1173 is a trade designation for 2-hydroxy-2-methyl-1-phenyl-propan-1-one that was obtained from BASF (Florham Park, N.J., USA). This was used as a photoinitiator.

HDDA refers to 1,6-hexanediol diacrylate that was obtained from Sartomer (Exton, Pa., USA).

Isooctyl acrylate (IOA) was obtained from 3M Company (St. Paul, Minn., USA).

HOSTAPHAN 3SAB is a trade designation for poly(ethylene terpthalate) (PET) that was obtained from Mitsubishi Polyester Film Inc. (Greer, S.C., USA).

T10 and T50 are trade designations for release films that were obtained from CP Films (Fieldale, Va., USA).

The monomer 2-Ethyl hexyl acrylate (EHA) can be obtained from Dow Chemical (Midland, Mich., USA) or BASF (Florham Park, N.J., USA).

Preparatory Example 1

1-Butyl acryloxy glycolate (BGA)

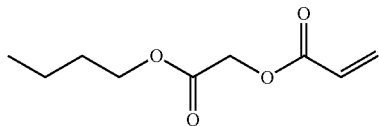

A mixture of 1-butyl glycolate (90.00 grams, 0.681 moles), toluene (200 mL), and triethylamine (57.42 grams, 0.567 moles) was stirred and cooled to 0° C. under a nitrogen atmosphere. Acryloyl chloride (51.4 grams, 0.567 moles) was added dropwise via an addition funnel over a period of 4 hours. The solvent was then removed under reduced pressure. Ethyl acetate (300 mL) was added and the mixture was filtered through CELITE, washed with saturated aqueous sodium bicarbonate. The solvent was removed under reduced pressure. The crude yellow oil was purified by vacuum distillation. A colorless oil (1-butyl acryloxy glycolate) was collected at 59-65° C. at 0.66 mm Hg (90.16 grams).

Preparatory Example 2

1-Octyl acryloxy glycolate (OGA)

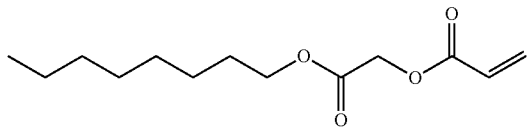 [SMILES: C=CC(=O)OCC(=O)OCCCCCCCC]

A mixture of glycolic acid (100.00 grams, 0.92 moles, 70 weight percent solution in water), 1-octanol (185.16 grams, 1.42 moles), toluene (250 mL), and methanesulfonic acid (0.12 grams, 1.2 mmoles) was heated to reflux for 3 hours. The water liberated was collected in a Dean Stark trap. The mixture was cooled and then washed with saturated aqueous sodium bicarbonate. The solvent was removed under vacuum to give a crude oil that was purified by vacuum distillation. A colorless oil (1-octyl glycolate) was collected at 95-96° C. at 0.2 mm Hg (22.76 grams).

A mixture of 1-octyl glycolate (20.00 grams, 0.11 moles), methylene chloride (100 mL), and triethylamine (12.14 grams, 0.12 moles) was cooled in an ice bath. Acryloyl chloride (10.86 grams, 0.12 moles) was added dropwise over 30 minutes. The mixture was stirred for 2 hours and then filtered. The solution was concentrated under vacuum, diluted with ethyl acetate (100 mL), and washed with saturated aqueous sodium bicarbonate. The solvent was removed under vacuum to give a crude oil that was purified by vacuum distillation. A colorless oil (1-octyl acryloxy glycolate) was collected at 102-108° C. at 0.20 mm Hg (20.88 grams).

Preparatory Example 3

2-Ethyl hexyl acryloxy glycolate (EHGA)

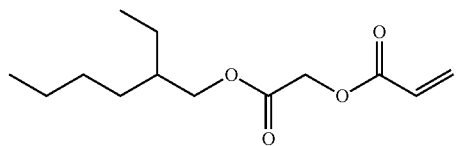 [SMILES: C=CC(=O)OCC(=O)OCC(CC)CCCC]

A mixture of 2-ethylhexanol (156.28 grams, 1.2 moles), bromoacetic acid (142.90 grams, 1.04 moles), toluene (400 mL), and methanesulfonic acid (0.40 grams, 4 2 mmoles) was heated to reflux for 3 hours. The water liberated was collected in a Dean Stark trap. The mixture was cooled and then washed with saturated aqueous sodium bicarbonate. The solvent was removed under vacuum to give a crude oil that was purified by vacuum distillation. A colorless oil (2-ethylhexyl bromoacetate) was collected at 75-80° C. at 0.25 mm Hg (263.55 grams).

A mixture of 2-ethylhexyl bromoacetate (150.00 grams, 0.60 moles), acrylic acid (54.71 grams, 0.76 moles), potassium carbonate (62.66 grams, 0.45 moles), and dimethylformamide (450 mL) was heated to 90° C. with stirring for two hours. The mixture was filtered, diluted with water (700 mL), and extracted with ethyl acetate (500 mL). The organic phase was washed with saturated aqueous sodium bicarbonate and dried with magnesium sulfate. The solvent was removed under vacuum to give a crude oil that was purified by vacuum distillation. A colorless oil (2-ethyl hexyl acryloxy glycolate) was collected at 95-100° C. at 0.30 mm Hg (112.84 grams).

Preparatory Examples 4-8

Various alkyl acrolyoxy lacates (Ethyl acryloxy lactate (ELA), 1-butyl acryloxy lactate (BLA), 1-octyl acryloxy lactate (OLA), 2-octyl acryloxy lactate (2OLA), and 2-ethylhexyl acryloxy lactate (EHLA))

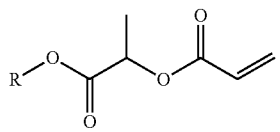

The following two alkyl lactates were synthesized while the remaining alkyl lactates were commercially available: 1-octyl lactate and 2-octyl lactate.

A mixture of lactic acid (90% solution in water, Aldrich), alcohol (1-octanol or 2-octanol), toluene, and methanesulfonic acid (MSA) was heated to reflux for 3 hours. The water liberated was collected in a Dean Stark trap. The mixture was cooled and then washed with aqueous saturated sodium bicarbonate. The solvent was removed under vacuum to give a crude oil that was purified by vacuum distillation. The amounts of each component in the two reaction mixtures are shown in Table 1.

TABLE 1

| | Preparation of n-octyl lactate and 2-octyl lactate | | | | | |
|---|---|---|---|---|---|---|
| Alcohol | Alcohol, (grams) | Lactic acid, (grams) | Toluene, (mL) | MSA, (grams) | Product boiling point | Yield, (grams) |
| 1-octanol | 400.00 | 203.80 | 600 | 0.30 | 88-92° C. at 0.2 mm Hg | 159.52 |
| 2-octanol | 125.89 | 62.73 | 200 | 0.08 | 88-92° C. at 0.3 mm Hg | 57.38 |

A mixture of alkyl lactate (ethyl lactate for Preparatory Example 4, 1-butyl lactate for Preparatory Example 5, 1-octyl lactate for Preparatory Example 6, 2-octyl lactate for Preparatory Example 7, and 2-ethylhexyl lactate for Preparatory Example 8), methylene chloride, and triethylamine (TEA) was cooled in an ice bath. Acryloyl chloride was added dropwise over 30 minutes. Each mixture was stirred for 2 hours and then filtered. The solution was concentrated under vacuum, diluted with ethyl acetate, and washed with saturated aqueous sodium bicarbonate. The solvent was removed under vacuum to give a crude oil that was purified by vacuum distillation. All products were isolated as colorless oils. The compositions are summarized in Table 2.

TABLE 2

| | Synthesis conditions for Preparatory 4-8 | | | | | | |
|---|---|---|---|---|---|---|---|
| Prep Example | Group R in Alkyl lactate | Alkyl lactate, (grams) | Methylene chloride, (mL) | TEA, (grams) | Acryloyl chloride, (grams) | Product Boiling Point | Yield, (grams) |
| 4 | ethyl | 150.45 | 300 | 120.69 | 126.61 | 65-68° C. at 0.45 mm Hg | 156.10 |
| 5 | 1-butyl | 400.17 | 2000 | 305.33 | 273.55 | 68-72° C. at 0.2 mm Hg | 464.78 |
| 6 | 1-octyl | 150.00 | 750 | 82.95 | 74.22 | 98-103° C. at 0.3 mm Hg | 147.80 |
| 7 | 2-octyl | 20.00 | 100 | 11.00 | 10.00 | 95-98° C. at 0.3 mm Hg | 14.90 |
| 8 | 2-ethylhexyl | 60.00 | 200 | 32.38 | 29.53 | 95-98° C. at 0.6 mm Hg | 63.18 |

Preparatory Example 9

1-Hexyl acryloxy lactate (HLA)

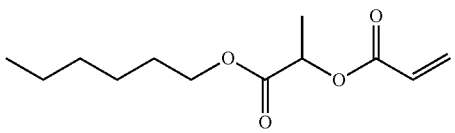 [SMILES: C=CC(=O)OC(C)C(=O)OCCCCCC]

A mixture of 1-hexanol (200.00 grams, 2.0 moles), 2-chloropropionic acid (206.19 grams, 1.9 moles), toluene (500 mL), and methanesulfonic acid (0.50 grams, 5 2 mmoles) was heated to reflux for 4 hours. The water liberated was collected in a Dean Stark trap. The mixture was cooled, washed with saturated aqueous sodium bicarbonate, and dried over magnesium sulfate. The solvent was removed under vacuum to give a crude oil that was purified by vacuum distillation. A colorless oil (1-hexyl-2-chloropropionate) was collected at 63-66° C. at 0.30 mm Hg (358.29 grams).

A mixture of 1-hexyl-2-chloropropionate (80.00 grams, 0.60 moles), acrylic acid (37.38 grams, 0.52 moles), potassium carbonate (35.93 grams, 0.26 moles), and dimethylformamide (300 mL) were heated to 90° C. with stirring for 5 hours. The mixture was filtered, diluted with water (300 mL), and extracted with ethyl acetate (400 mL). The organic phase was washed with saturated aqueous sodium bicarbonate and dried with magnesium sulfate. The solvent was removed under vacuum to give a crude oil that was purified by vacuum distillation. A colorless oil (1-hexyl acryloxy lactate) was collected at 88-89° C. at 0.80 mm Hg (77.71 grams).

Preparatory Example 10

1-Butyl-2-acryloxy hexanoate (BAH)

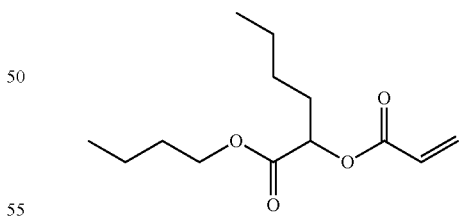

A mixture of 1-butanol (60.17 grams, 0.81 moles), 2-bromohexanoic acid (126.53 grams, 0.65 moles), toluene (200 mL), and methanesulfonic acid (0.17 grams, 1.8 mmoles) was heated to reflux for 3 hours. The water liberated was collected in a Dean Stark trap. The mixture was cooled, diluted with ethyl acetate (100 mL), and then washed with saturated aqueous sodium bicarbonate. The solvent was removed under vacuum to give a crude oil that was purified by vacuum distillation. A colorless oil (1-butyl-2-bromohexanoate) was collected at 80-82° C. at 2.0 mm Hg (142.02 grams).

A mixture of 1-butyl-2-bromohexanoate (60.00 grams, 0.24 moles), acrylic acid (21.53 grams, 0.30 moles), potassium carbonate (21.00 grams, 0.15 moles), and dimethylformamide (200 mL) was heated to 90° C. with stirring for 2 hours. The mixture was filtered, diluted with water (500 mL), and extracted with ethyl acetate (200 mL). The organic phase was washed with saturated aqueous sodium bicarbonate and dried with magnesium sulfate. The solvent was removed under vacuum to give a crude oil that was purified by vacuum distillation. A colorless oil (1-butyl-2-acryloxy hexanoate) was collected at 96-98° C. at 0.90 mm Hg (49.44 grams).

Preparatory Example 11

ETHYL-2-acryloxy-2-methyl propionate (EAMP)

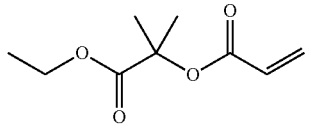

A mixture of ethyl-2-hydroxy isobutyrate (60.00 grams, 0.45 moles), methylene chloride (300 mL), and triethylamine (52.62 grams, 0.52 moles) was cooled in an ice bath. Acryloyl chloride (47.07 grams, 0.52 moles) was added dropwise over 60 minutes. The mixture was stirred for 17 hours and then filtered. The solution was concentrated under vacuum, diluted with ethyl acetate (200 mL), and washed with saturated aqueous sodium bicarbonate. The solvent was removed under vacuum to give a crude oil that was purified by vacuum distillation. A colorless oil was collected at 42-45° C. at 0.80 mm Hg (32.59 grams). The product was then redistilled at 42-45° C. at 0.80 mm Hg to give ethyl-2-acryloxy-2-methyl propionate as a colorless oil (25.29 grams).

Preparatory Example 12

1-Butyl-3-acryloxy-butyrate (BAB)

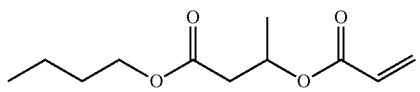

A mixture of 1-butyl acetoacetate (40.00 grams, 0.25 moles) and 1-butanol (200 mL) was cooled in a cold water bath. Sodium borohydride (4.78 grams, 0.13 moles) was added portionwise over 1 hour.
The mixture was then stirred at room temperature for 17 hours. The mixture was filtered and concentrated under vacuum. The crude oil was diluted with ethyl acetate (200 mL), washed with water and aqueous saturated sodium bicarbonate, and then dried over magnesium sulfate. The solvent was removed under vacuum to give a crude oil that was purified by vacuum distillation. A colorless oil (1-butyl-3-hydroxybutyrate) was collected at 65-66° C. at 1.0 mm Hg (20.11 grams).
A mixture of 1-butyl-2-hydroxybutyrate (20.11 grams, 0.13 moles), methylene chloride (100 mL), and triethylamine (14.17 grams, 0.14 moles) was cooled in an ice bath. Acryloyl chloride (12.67 grams, 0.14 moles) was added dropwise over 60 minutes. The mixture was stirred for 1 hour and filtered. The solution was concentrated under vacuum, diluted with ethyl acetate (250 mL), and washed with saturated aqueous sodium bicarbonate. The solvent was removed under vacuum to give a crude oil that was purified by vacuum distillation. A colorless oil (1-butyl-3-acryloxy-butyrate) was collected at 80-84° C. at 0.50 mm Hg (16.18 grams).

Preparatory Example 13

Ethyl-6-acryloxy-hexanoate (EAH)

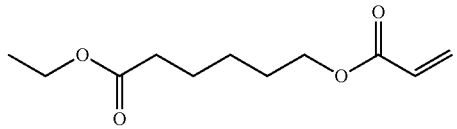

A mixture of ethyl-6-hydroxyhexanoate (49.44 grams, 0.31 moles), methylene chloride (200 mL), and triethylamine (36.26 grams, 0.36 moles) was cooled in an ice bath. Acryloyl chloride (29.87 grams, 0.33 moles) was added dropwise over 60 minutes. The mixture was stirred for 3 hours and filtered. The solution was concentrated under vacuum and diluted with ethyl acetate (300 mL). The mixture was washed with saturated aqueous sodium bicarbonate and water, and then dried over magnesium sulfate. The solvent was removed under vacuum to give a crude oil that was purified by vacuum distillation. A slightly yellow oil (ethyl-6-acryloxy-hexanoate) was collected at 90-92° C. at 0.70 mm Hg (51.27 grams). A portion of this oil (40 grams) was further purified by column chromatography over silica gel using 10 volume percent ethyl acetate in hexane to give the product as a colorless oil.

Preparatory Example 14

1,4-Butyl bis(acryloxy)lactate

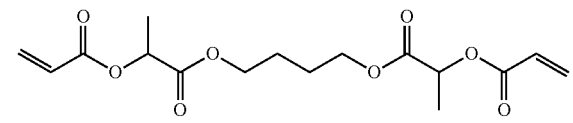

A mixture of 1,4-butanediol (39.65 grams, 0.44 moles), 2-bromopropionic acid (150.00 grams, 0.98 moles), toluene (400 mL), and methanesulfonic acid (0.20 grams, 2.1 mmoles) was heated to reflux for 3 hours. The water liberated was collected in a Dean Stark trap. The mixture was cooled, then washed with saturated aqueous sodium bicarbonate and dried over magnesium sulfate. The solvent was removed under vacuum to give a crude oil that used without further purification (160.37 grams)
A mixture of 1,4-bis-butyl-2-bromopropionate (130.31 grams, 0.36 moles), acrylic acid (69.13 grams, 0.96 moles), potassium carbonate (76.54 grams, 0.55 moles), and dimethylformamide (450 mL) were heated to 90° C. with stirring for 2 hours. The mixture was filtered, concentrated under vacuum, diluted with water (300 mL), and extracted with ethyl acetate (400 mL). The organic phase was washed with saturated aqueous sodium bicarbonate and dried with magnesium sulfate. The solvent was removed under vacuum to give a crude oil that was purified by column chromatography over silica gel using a gradient of 20-40 weight percent ethyl acetate in hexane. The product was isolated as a colorless oil (1,4-butyl bis(acryloxy)lactate, 27.60 grams).

Preparatory Example 15

Benzyl-2-acryloxy lactate (BzLA)

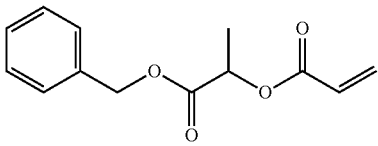 [SMILES: C=CC(=O)OC(C)C(=O)OCc1ccccc1]

A mixture of benzyl alcohol (102.73 grams, 0.95 moles), 2-bromopropionic acid (151.03 grams, 0.99 moles), toluene (400 mL), and methanesulfonic acid (0.30 grams, 3.1 mmoles) was heated to reflux for 3 hours. The water liberated was collected in a Dean Stark trap. The mixture was cooled and washed with saturated aqueous sodium bicarbonate. The solvent was removed under vacuum to give a crude oil that was purified by vacuum distillation. A colorless oil (benzyl-2-bromopropionate) was collected at 100-103° C. at 0.3 mm Hg (215.91 grams).

A mixture of benzyl-2-bromopropionate (140.25 grams, 0.58 moles), acrylic acid (52.24 grams, 0.30 moles), potassium carbonate (59.64 grams, 0.43 moles), and dimethylformamide (450 mL) was heated to 90° C. with stirring for 2 hours. The mixture was cooled, diluted with water (300 mL), and extracted with ethyl acetate (300 mL). The organic phase was washed with saturated aqueous sodium bicarbonate and water. The organic phase was dried with magnesium sulfate and filtered through CELITE. The solvent was removed under vacuum to give a crude oil that was purified by vacuum distillation. A colorless oil (benzyl-2-acryloxy lactate) was collected at 110-112° C. at 0.20 mm Hg (50.13 grams).

Test Method 1: Differential Scanning Calorimetric (DSC) Analysis of Polymer Films Approximately 10 milligrams of each of the polymers (homopolymers and (meth)acrylic-based elastomeric material) was placed in individual standard aluminum DSC pans (Thermal Analysis Model T080715) and placed in the autosampler of a differential scanning calorimeter (TA DSC Q200, Thermal Analysis Instruments). For each sample analysis, pans were individually placed on one of the differential posts in the DSC's enclosed cell along with an empty reference pan on another post. The temperature was cycled between −85° C. and 150° C. twice at 10° C. per minute. The glass transition temperature ($T_g$) were identified as the peak in the scanning heat flow versus temperature of the second heating cycle. The glass transition is generally represented by a shift in the heat flow profile. After the glass transition, the heat flow profile is parallel to that before the glass transition but shifted to a lower heat flow value. The glass transition temperature is recorded at the inflection point of the curve associated with this shift in the heat flow profile.

Test Method 2: Shear Strength Test

The adhesive films described in the Examples were cut into strips 1.27 centimeter in width and adhered by their adhesive to flat, rigid stainless steel plates with exactly 2.54 centimeter length of each adhesive film strip in contact with the plate to which it was adhered. A weight of 2 kilograms (4.5 pounds) was rolled over the adhered portion. Each of the resulting plates with the adhered film strip was equilibrated for 15 minutes at room temperature (23° C.). Then, a 1000 grams weight was hung from the free end of the adhered film strip, with the panel tilted 2 degrees from the vertical to insure against any peeling forces. The time (in minutes) at which the weight fell, as a result of the adhesive film strip releasing from the plate by the modes of failure shown below, was the "RT Shear (min)" at 23° C. (1000 grams). The test was discontinued at 10,000 minutes if there was no failure. In Table 4; this is designated as 10,000+ minutes. Three specimens of each tape (adhesive film strip) were tested and the shear strength tests were averaged to obtain the reported shear value.

Test Method 3: Peel Adhesion Test

Peel adhesion was the force required to remove an adhesive-coated test specimen from a test panel measured at a specific angle and rate of removal. In the Examples, this force is expressed in ounces per inch width of the test specimen. The following procedure was used:

(1) A test specimen 1.27 cm (0.5 inches) wide was applied to a horizontally positioned clean glass test plate. A 2.2 kilogram rubber roller was used to press a 10.16 cm (4 inches) length of the test specimen into firm contact with the glass surface.

(2) The free end of the test specimen was doubled back, nearly touching itself, so the angle of removal was 180°. The free end of the test specimen was attached to the adhesion tester scale.

(3) The glass test plate was clamped in the jaws of a tensile testing machine which was capable of moving the plate away from the scale at a constant rate of 30.48 cm (12 inches) per minute.

(4) The scale reading in ounces was recorded as the test specimen was peeled from the glass surface. The resulting peel adhesion was converted from ounces per 0.5 inch to ounces per inch (N/dm) to yield the final peel adhesion listed in Table 4.

Reference Examples 1-15

Homopolymer Preparation and Characterization

Homopolymers were prepared using a two step photopolymerization method. In the first step, 20 grams of monomer and 0.04 grams of IRGACURE 651 were placed in a small vial. The solution was inserted with nitrogen gas for 2 minutes, and then exposed to UV light from a UVP Blak-Ray XX-15BLB UV Bench Lamp (365 nm, UVP, Upland, Calif.) until the viscosity increased. Viscosity increases were observed qualitatively from the slowing of nitrogen bubbles passing through the solution. The photopolymerization was quenched by sparging with air for one minute to yield the pre-polymer mixture. In the second step, the pre-polymer mixture was coated at a thickness of 0.127 millimeters between T10 and T50 release liners. All three layers were then exposed to 2.2 J/cm² of UVA light during a dual sided cure.

The homopolymers were characterized by differential scanning calorimetry (DSC) according to test method 1.

TABLE 3

Glass transition temperature of homopolymers of Reference Examples 1-14

| Reference Example | Preparatory Example | Monomer | Homopolymer $T_g$ (° C.) |
|---|---|---|---|
| 1 | 1 | BGA | −22.9 |
| 2 | 2 | OGA | −25.5 |
| 3 | 3 | EHGA | −33.3 |
| 4 | 4 | ELA | NM |
| 5 | 5 | BLA | −27.8 |
| 6 | 6 | OLA | −46.1 |
| 7 | 8 | EHLA | −39.8 |
| 8 | 9 | HLA | −39.4 |
| 9 | 10 | BAH | −41.3 |
| 10 | 11 | EAMP | 17.2 |

TABLE 3-continued

Glass transition temperature of homopolymers of Reference Examples 1-14

| Reference Example | Preparatory Example | Monomer | Homopolymer $T_g$ (° C.) |
|---|---|---|---|
| 11 | 12 | BAB | −32.4 |
| 12 | 13 | EAH | −62 |
| 13 | 15 | BzLA | 18.5 |
| 14 | — | IOA | −54.8 |
| 15 | — | EHA | −45.6 |

NM: Not Measured

Examples 1-10 and Comparative Examples 1-2

Preparation of (meth)acrylic-based Elastomeric Material

Examples 1-7 and Comparative Examples 1 and 2 were prepared by a two step photopolymerization process. In the first step, 18 grams of monomer (as identified in Table 4), 2 grams of acrylic acid, and 0.04 grams of IRGACURE 651 were placed in a small vial. The solution was inserted with nitrogen gas for 2 minutes, and then exposed to UV light from a UVP Black-Ray XX-15BLB UV Bench Lamp (365 nm) until the viscosity increased. Viscosity increases were observed qualitatively from the slowing of nitrogen bubbles passing through the mixture. The photopolymerization was quenched by sparging with air for one minute to yield the pre-polymer mixture. In the second step, 23.8 microliters (0.12 weight percent) of crosslinker was added to the pre-polymer mixture. In Examples 1-5 and Comparative Examples 1-2, the crosslinker was 1,6-hexanediol diacrylate (HDDA). In Examples 6 and 7, the crosslinker was 1,4-butane diol bislactyl diacrylate (from Preparatory Example 14). Each resulting mixture was mixed vigorously through shaking and then coated at a thickness of 0.127 millimeter between T10 and T50 release liners from CP Films (Fieldale, Va., USA) to prepare a transfer tape. Films were then exposed to 2.2 J/cm² of UVA light during a dual sided cure.

For Example 8, 6 grams of isooctyl acrylate, 12 grams of BGA, 2 grams of acylic acid, and 0.04 grams of IRGACURE 651 were combined in a small vial and polymerized as described above.

For example 9, 10 grams of IOA, 8 grams of BGA, 2 grams of acylic acid, and 0.04 grams of IRGACURE 651 were combined in a small vial and polymerized as described above.

For Example 10, 14 grams of IOA, 4 grams of BGA, 2 grams of acylic acid, and 0.04 grams of IRGACURE 651 were combined in a small vial and polymerized as described above.

Each adhesive layer was transferred and laminated to the primed side of 0.0508 mm thick HOSTAPHAN 3SAB poly (ethylene terpthalate) films before being characterized according to Test Methods 1-3. The films were primed as received from the supplier.

TABLE 4

Characterization of Examples 1-10 and Comparative Examples 1-2

| Example | Monomer | $T_g$ (° C.) | RT Shear (min) | Peel Adhesion (oz/in, N/dm) |
|---|---|---|---|---|
| 1 | BGA | −2.1 | 10,000+ | 75.5, 82.6 |
| 2 | OGA | −3.3 | 10,000+ | 62.8, 68.7 |
| 3 | EHGA | −17.5 | 10,000+ | 85.0, 93.0 |
| 4 | BLA | 2.4 | 10,000+ | 82.5, 90.3 |
| 5 | EHLA | −19.2 | 10,000+ | 101.9, 111.5 |
| 6 | BGA | −3.3 | 10,000+ | 59.6, 65.2 |
| 7 | BLA | −2.1 | 10,000+ | 72.1, 78.9 |
| 8 | IOA/BGA | −9.7 | 10,000+ | 49.2, 53.9 |
| 9 | IOA/BGA | −17.1 | 10,000+ | 78.1, 85.5 |
| 10 | IOA/BGA | −26.7 | 10,000+ | 85.9, 94.0 |
| C1 | IOA | −34.9 | 10,000+ | 98.0, 107.3 |
| C2 | EHA | −48 | 10,000+ | 90.3, 98.8 |

Examples 11-22 and Comparative Examples 3-4

Degradation and/or Removal of Adhesive Layer

A degradation test was used to mimic the conditions a pressure sensitive adhesive would be exposed to during polyester recycling. In this test, HOSTAPHAN 3SAB PET was cut into 38.1 mm by 127 millimeter strips, washed with deionized water, and dried for 2 hours at 80° C. in pre-weighed aluminum pans. After drying, the PET strips and aluminum pans were weighed. Strips of the pressure sensitive adhesive layers (25.4 mm by 76.2 mm of Examples 1-10 and Comparative Examples 1-2) were then laminated to the treated PET strips to prepare adhesive tapes. The corresponding adhesive tape is identified in Table 4 for each degradation test sample. The adhesive tape samples were dried at 80° C. for 1 hour and reweighed at temperature. After 24 hours, each adhesive tape sample was placed in 800 mL of caustic soda solution (2 weight percent NaOH in deionized water) at 80° C. This solution was stirred at 500 revolutions per minute. After 8 minutes submerged in this solution, the adhesive tapes were removed, washed with deionized water, and dried for 2 hours at 80° C. The samples were then weighed again. If the samples still appeared wet, they were dried further at 120° C. for 2 hours and weighed again. The weight loss of the samples is shown in Table 5.

Additionally, the time for the adhesive to separate from the PET backing was measured for Examples 1-10 and Comparative Examples 1-2. In this case, the time for the adhesive to de-bond from the backing was defined as the amount of time (in minutes) necessary for the adhesive to detach completely from the PET film. The test was carried out in the same fashion as above except that the sample was submerged in the caustic soda solution until the adhesive de-bonded.

For Example 21, the time for adhesive de-bond was determined as mentioned above, except a solution of 2 weight percent KOH in deionized water was used instead of 2 weight percent NaOH.

In example 22, the time for adhesive de-bond was determined as mentioned above, except a solution of 2 weight percent tetra butyl ammonium hydroxide was used instead of 2 weight percent NaOH.

TABLE 5

Degradation of Examples 11-20 and Comparative Examples 3-4

| Example | Adhesive Example | Monomer | % Weight Loss (after 8 minutes) | Time for Adhesive De-Bond (minutes) |
|---|---|---|---|---|
| 11 | 1 | BGA | 99.7 | 2.7 |
| 12 | 2 | OGA | 9.9 | 40.3 |

TABLE 5-continued

Degradation of Examples 11-20 and Comparative Examples 3-4

| Example | Adhesive Example | Monomer | % Weight Loss (after 8 minutes) | Time for Adhesive De-Bond (minutes) |
|---|---|---|---|---|
| 13 | 3 | EHGA | 0.3 | 184.0 |
| 14 | 4 | BLA | 76.4 | 9.3 |
| 15 | 5 | EHLA | 0.2 | 420.5 |
| 16 | 6 | BGA | 78.9 | 8.4 |
| 17 | 7 | BLA | 47.0 | 16.1 |
| 18 | 8 | IOA/BGA | NM | 6.1 |
| 19 | 9 | IOA/BGA | NM | 14.9 |
| 20 | 10 | IOA/BGA | NM | 117.0 |
| 21 | 1 | BGA | NM | 3.5 |
| 22 | 1 | BGA | NM | 13.6 |
| C3 | C1 | IOA | −0.2 | >480* |
| C4 | C2 | EHA | 0.4 | >480* |

*The sampes had not separated from the backing after 480 minutes
NM: Not Measured Examples 23-35 and Comparative Examples C5-C9

Degradation of (meth)acrylic Copolymers in 1.0 M Sodium Hydroxide

In clear glass vials, monomers of Preparatory Examples 1-13 were mixed with acrylic acid (AA) and DAROCUR 1173 to prepare Examples 23-35. Likewise, monomers of Preparatory Examples 5-7 were mixed with DAROCUR 1173 to prepare Comparative Examples C5-C7. IOA was mixed with DAROCUR 1173 to prepare Comparative Example 8 while IOA was mixed with both AA and DAROCUR 1173 to prepare Comparative Example 9. Each mixture was bubbled with nitrogen for 1 minute, and the vial was capped. The vials were placed under a UVP Black-Ray XX-15BLB UV Bench Lamp (365 nm) and irradiated with a dose of 850 mJ/cm$^2$ to prepare a (meth)acrylic-based homopolymer or copolymer.

Approximately 100 mg of each sample was placed in a vial and filled with 6 mL of 1.0 M sodium hydroxide in water. The vials were capped and either left at room temperature (about 32° C.) or placed in an oven at 90° C. The degradation time in Table 6 was defined as the time for complete dissolution (clear liquid) or formation of a two phase liquid/liquid mixture with no solid visible.

TABLE 6

Degradation results of (meth)acrylate copolymers

| EX | Prep Ex | PrepEx, (grams) | AA, (grams) | DAROCUR 1173, (milligrams) | Weight polymer, (milligrams) | Room Temp. Degradation time, (hours) | Weight polymer, (milligrams) | 90° C. Degradation time, (hours) |
|---|---|---|---|---|---|---|---|---|
| 23 | 1 | 2.697 | 0.316 | 24 | | | 106 | 1.5 |
| 24 | 2 | 2.709 | 0.312 | 28 | | | 90 | 4.0 |
| 25 | 3 | 2.704 | 0.303 | 24 | | | 90 | 7.0 |
| 26 | 4 | 0.900 | 0.100 | 8 | | | 117 | 1.0 |
| C5 | 5 | 2.995 | | 30 | 95 | >240 | 99 | 16.0 |
| 27 | 5 | 2.697 | 0.317 | 27 | 113 | 10.0 | 105 | 2.0 |
| C6 | 6 | 3.004 | | 30 | 91 | >240 | 102 | 16.0 |
| 28 | 6 | 2.707 | 0.304 | 25 | 108 | 114.0 | 114 | 2.0 |
| C7 | 7 | 1.363 | | 17 | 105 | >240 | 110 | >240* |
| 29 | 7 | 1.620 | 0.130 | 19 | 103 | 162.0 | 114 | 42.0 |
| 30 | 8 | 2.700 | 0.305 | 25 | | | 124 | 15.0 |
| 31 | 9 | 2.702 | 0.302 | 30 | | | 100 | 5.5 |
| 32 | 10 | 2.700 | 0.297 | 25 | | | 124 | 15.0 |
| 33 | 11 | 1.797 | 0.197 | 15 | | | 90 | 5.0 |
| 34 | 12 | 0.899 | 0.102 | 7 | | | 116 | 4.0 |
| 35 | 13 | 2.697 | 0.296 | 24 | | | 113 | 2.5 |
| C8 | IOA | 3.010 | | 38 | 93 | >240 | 84 | >240* |
| C9 | IOA | 3.069 | 0.347 | 25 | 110 | >240 | 119 | >240* |

*The degradation test was stopped after 240 hours

The above examples show that the degradation time can shortened by the use of the co-monomer acrylic acid and by aging in basic solution at elevated temperature. The degradation time can also be controlled by the chemical structure of the preparative monomer.

Examples 27-29 and Comparative Examples C5-C9

Degradation of (meth)acrylic Copolymers in Deionized Water and 1.0 M Hydrochloric Acid The same polymers prepared as described above in Examples 27-29 and Comparative Examples C5-C9 were used for the following degradation studies.

Approximately 100 mg of each sample was placed in a vial and filled with 6 mL of deionized water or 1.0 M hydrochloric acid in water. The vials were capped and placed in an oven at 90° C. The degradation time in Table 7 was defined as the time for complete dissolution (clear liquid) or formation of a two phase liquid/liquid mixture with no solid visible.

TABLE 7

Degradation results of (meth)acrylate copolymers

| Example | Prep Example | Weight polymer, (milligrams) | Degradation time in water, (hours) | Weight polymer, (milligrams) | Degradation time in 1.0M HCl, (hours) |
|---|---|---|---|---|---|
| C5 | 5 | 74 | >336* | 86 | 336 |
| 27 | 5 | 158 | 264 | 150 | 264 |

TABLE 7-continued

Degradation results of (meth)acrylate copolymers

| Example | Prep Example | Weight polymer, (milligrams) | Degradation time in water, (hours) | Weight polymer, (milligrams) | Degradation time in 1.0M HCl, (hours) |
|---|---|---|---|---|---|
| C6 | 6 | 45 | >336* | 157 | >336* |
| 28 | 6 | 140 | >336* | 118 | >336* |
| C7 | 7 | 78 | >336* | 59 | >336* |
| 29 | 7 | 78 | >336* | 67 | >336* |
| C8 | IOA | 105 | >336* | 115 | >336* |
| C9 | IOA | 89 | >336* | 105 | >336* |

*The degradation test was stopped after 336 hours

The above examples show that the degradation time of the polymers is much longer in deionized water or 1.0 M hydrochloric acid compared to 1.0 M sodium hydroxide.

We claim:

1. A pressure-sensitive adhesive comprising a copolymeric (meth)acrylic-based elastomeric material comprising a reaction product of polymerizable material comprising:
   (a) a first monomer that is of Formula (I)

$$R^1-O-(CO)-Y-O-(CO)-C(R^3)=CH_2 \quad (I)$$

wherein
   $R^1$ is an alkyl, aryl, or a combination thereof;
   Y is a branched or linear alkylene of formula $-C_n(R^2)_{2n}-$;
   $R^2$ is hydrogen or alkyl;
   n is an integer in a range of 1 to 12;
   $R^3$ is hydrogen or methyl; and
   (b) a second monomer having an ethylenically unsaturated group.

2. The pressure-sensitive adhesive of claim 1, wherein the (meth)acrylic-based elastomeric material has a glass transition temperature ($T_g$) no greater than 10 °C.

3. The pressure-sensitive adhesive of claim 1, wherein the first monomer of Formula (I) is of Formula (Ia) or (Ic)

$$R^1-O-(CO)-C_nH_{2n}-O-(CO)-C(R^3)=CH_2 \quad (Ia)$$

$$R^1-O-(CO)-C_nH_p(R^{2a})_q-O-(CO)-C(R^3)=CH_2 \quad (Ic)$$

wherein
   $R^{2a}$ is an alkyl; and
   p is an integer equal to at least zero;
   q is n integer equal to at least 1; and
   the sum (p+q) is equal to 2n.

4. The pressure-sensitive adhesive of claim 1, wherein the first monomer of Formula (I) is of Formula (Ib), (Id), or (Ie)

$$R^1-O-(CO)-CH_2-O-(CO)-C(R^3)=CH_2 \quad (Ib)$$

$$R^1-O-(CO)-CHR^{2a}-O-(CO)-C(R^3)=CH_2 \quad (Id)$$

$$R^1-O-(CO)-C(R^{2a})_2-O-(CO)-C(R^3)=CH_2 \quad (Ie)$$

wherein $R^{2a}$ is an alkyl.

5. The pressure-sensitive adhesive of claim 1, wherein $R^3$ is hydrogen.

6. The pressure-sensitive adhesive of claim 1, wherein the first monomer is $CH_3CH_2CH_2CH_2-O-(CO)-CH_2-O-(CO)-CH_2=CH_2$ or $CH_3CH_2CH_2CH_2-O-(CO)-CH(CH_3)-O-(CO)-CH_2=CH_2$.

7. The pressure-sensitive adhesive of claim 1, wherein the polymerizable material comprises 20 to 99.5 weight percent of the first monomer of Formula (I) and 0.5 to 80 weight percent of the second monomer based on a total weight of polymerizable material.

8. The pressure-sensitive adhesive of claim 1, wherein the second monomer is a crosslinker monomer having at least two ethylenically unsaturated groups, a non-polar monomer with a single ethylenically unsaturated group, a polar monomer with a single ethylenically unsaturated group, or a mixture thereof.

9. The pressure-sensitive adhesive of claim 8, wherein the polymerizable material comprises at least 50 weight percent of the first monomer of Formula (I) and up to 15 weight percent of the polar monomer based on a total weight of polymerizable material.

10. The pressure-sensitive adhesive of claim 9, further comprising up to 5 weight percent of the crosslinker monomer.

11. The pressure-sensitive adhesive of claim 1, wherein $R^1$ is an alkyl having at least 4 carbon atoms.

12. The pressure-sensitive adhesive of claim 1, wherein pressure-sensitive adhesive undergoes ester hydrolysis in an aqueous solution having a pH greater than 7 at 80° C. within 24 hours.

13. An article comprising:
   1) a pressure-sensitive adhesive layer comprising a (meth)acrylic-based elastomeric material comprising a reaction product of polymerizable material comprising:
      (a) a first monomer that is of Formula (I)

$$R^1-O-(CO)-Y-O-(CO)-C(R^3)=CH_2 \quad (I)$$

wherein
   $R^1$ is an alkyl, aryl, or a combination thereof;
   Y is a branched or linear alkylene of formula $-C_n(R^2)_{2n}-$;
   $R^2$ is hydrogen or alkyl;
   n is an integer in a range of 1 to 12;
   $R^3$ is hydrogen or methyl; and
      (b) a second monomer having an ethylenically unsaturated group; and
   2) a substrate positioned adjacent to the pressure-sensitive adhesive layer.

14. A pressure-sensitive adhesive comprising a copolymeric (meth)acrylic-based elastomeric material comprising
   a) multiple first units of Formula (XX)

$$R^1-O-(CO)-Y-O-(CO)-\underset{\underset{*}{|}}{\overset{\overset{*}{|}}{\underset{CR^3}{\overset{CH_2}{|}}}} \quad (XX)$$

wherein
   $R^1$ is an alkyl, aryl, or a combination thereof;
   Y is a branched or linear alkylene of formula $-C_n(R^2)_{2n}-$;

$R^2$ is hydrogen or alkyl;
Group $R^3$ is hydrogen or methyl;
n is an integer in a range of 1 to 12; and b) multiple second units of Formula (XXI)

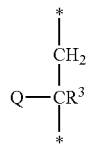

(XXI)

wherein
the second units of Formula (XXI) are derived from a second monomer that is a crosslinker monomer having at least two ethylenically unsaturated groups, a non-polar monomer with a single ethylenically unsaturated group, or a polar monomer with a single ethylenically unsaturated group; and
an asterisk (*) in Formula (XX) and (XXI) indicates where each unit is connected to another unit in the copolymeric (meth)acrylic-based elastomeric material.

15. The pressure-sensitive adhesive of claim 14, wherein the second monomer is (meth)acrylic acid or an alkyl (meth) acrylate.

* * * * *